United States Patent
Jung et al.

(10) Patent No.: US 12,033,557 B2
(45) Date of Patent: *Jul. 9, 2024

(54) SCREEN DISPLAY METHOD AND ELECTRONIC DEVICE SUPPORTING SAME

(71) Applicant: Samsung Electronics Co., Ltd., Gyeonggi-do (KR)

(72) Inventors: Jin Woo Jung, Seoul (KR); Young Gwon Koo, Seoul (KR); Dong Ryul Shin, Daegu (KR); Ho Saeng Kim, Gyeonggi-do (KR); Tae Hwan Wi, Suwon-si (KR); Jae Bong Chun, Gyeonggi-do (KR); Hyun Suk Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

This patent is subject to a terminal disclaimer.

(21) Appl. No.: 17/697,287

(22) Filed: Mar. 17, 2022

(65) Prior Publication Data

US 2022/0215785 A1    Jul. 7, 2022

Related U.S. Application Data

(63) Continuation of application No. 16/080,541, filed on Aug. 28, 2018, now Pat. No. 11,315,465, which is a
(Continued)

(30) Foreign Application Priority Data

May 2, 2016    (KR) .................. 10-2016-0054095

(51) Int. Cl.
*G09G 3/20*    (2006.01)
*G06F 3/041*    (2006.01)
(Continued)

(52) U.S. Cl.
CPC .......... *G09G 3/2003* (2013.01); *H01Q 1/243* (2013.01); *G06F 3/041* (2013.01);
(Continued)

(58) Field of Classification Search
CPC ......... G09G 3/2003; G09G 2320/0626; G09G 2320/0242; G09G 2320/0666; H04M 1/02;
(Continued)

(56) References Cited

U.S. PATENT DOCUMENTS 6,670,936 B1    12/2003   Akimoto
7,493,103 B2 *   2/2009   Finley, Jr. ................. H04L 1/00
                                                                    455/66.1
(Continued)

FOREIGN PATENT DOCUMENTS

CN    101770049 A    7/2010
JP    2012-253684 A    12/2012
(Continued)

OTHER PUBLICATIONS

Notice of Allowanced dated Oct. 25, 2022.
Indian Hearing Notice dated Nov. 15, 2023.

*Primary Examiner* — Wesner Sajous
(74) *Attorney, Agent, or Firm* — Cha & Reiter, LLC

(57) ABSTRACT

Disclosed is an electronic device that includes a display that outputs display data, an antenna arranged on a display area of the display, at least one processor electrically connected to the display, and a memory electrically connected to the processor, where the memory stores instructions that, when executed, cause the processor to correct the display data based on characteristic information of the antenna when a display location of the display data overlaps an arranged location of the antenna when the instructions are executed.

(Continued)

In addition, various embodiments that are understood through the present disclosure are possible.

11 Claims, 32 Drawing Sheets

Related U.S. Application Data continuation of application No. PCT/KR2017/004612, filed on Apr. 28, 2017.

(51) Int. Cl.
  *G09G 5/02* (2006.01)
  *H01Q 1/24* (2006.01)
  *H04N 1/60* (2006.01)
  *H04N 5/57* (2006.01)

(52) U.S. Cl.
  CPC .............. *G06F 2203/04105* (2013.01); *G09G 2320/0242* (2013.01); *G09G 2320/0626* (2013.01); *G09G 2320/0666* (2013.01)

(58) Field of Classification Search
  CPC ........ H01Q 1/243; H01Q 1/38; H01Q 1/2291; H01Q 1/48; H01Q 21/062; H01Q 21/065; H01Q 1/24; H05K 5/0017; H05K 7/20963; H05K 1/0209; H04N 5/50; H04N 17/045; G06F 2203/04105; G06F 3/041

See application file for complete search history.

(56) References Cited

U.S. PATENT DOCUMENTS

| | | | |
|---|---|---|---|
| 7,847,753 | B2 | 12/2010 | Ishibashi et al. |
| 8,503,123 | B2 | 8/2013 | Hwang et al. |
| 9,553,352 | B2 | 1/2017 | Pan et al. |
| 11,315,465 | B2 * | 4/2022 | Jung ....................... H01Q 13/10 |
| 2008/0094942 | A1 * | 4/2008 | Oguchi .................... H01Q 7/08 368/47 |
| 2009/0051620 | A1 | 2/2009 | Ishibashi et al. |
| 2015/0123860 | A1 | 5/2015 | Park et al. |
| 2015/0180544 | A1 * | 6/2015 | Morimoto ............. G06K 19/07 455/41.1 |
| 2015/0356929 | A1 | 12/2015 | Zhan |
| 2016/0093940 | A1 | 3/2016 | Pan et al. |
| 2016/0313769 | A1 | 10/2016 | Yoshitani et al. |
| 2017/0237152 | A1 | 8/2017 | Lee et al. |
| 2017/0295241 | A1 | 10/2017 | Hirukawa |
| 2020/0145604 | A1 * | 5/2020 | Lin .......................... H04N 5/50 |

FOREIGN PATENT DOCUMENTS

| | | |
|---|---|---|
| KR | 10-2007-0019315 A | 2/2007 |
| KR | 10-2010-0080368 A | 7/2010 |
| KR | 10-2012-0045142 A | 5/2012 |
| KR | 10-2015-0115024 A | 10/2015 |
| KR | 10-2015-0141821 A | 12/2015 |

* cited by examiner

SCREEN DISPLAY METHOD AND ELECTRONIC DEVICE SUPPORTING SAME

CROSS REFERENCE TO RELATED APPLICATIONS

This application is a Continuation of U.S. patent application Ser. No. 16/080,541, filed on Aug. 28, 2018, which is a Continuation of PCT International Application No. PCT/KR2017/004612, which was filed on Apr. 28, 2017, which claims priority to Korean Patent Application No. 10-2016-0054095, which was filed on May 2, 2016, the contents of which are incorporated herein by reference.

TECHNICAL FIELD

Embodiments relate to a screen display method.

BACKGROUND ART

An electronic device such as a smart phone and the like may include an antenna for a wireless communication function. For example, an antenna may be mounted on the lower layer of a display panel, or in an area other than the display area of a display. In addition, in recent years, as the number of users who prefer a large screen has increased, the size of the display has increased or electronic devices including sub-displays have been actively spread.

Technical Problem

However, when the size of a display is increased and a sub-display is included, the display area may be enlarged, but the space for arranging an antenna may be insufficient. Thus, the antenna may be arranged while overlapping the display area of the display. In this case, in the area where the mounting area of the antenna and the display area of the display overlap, the screen may not output an original color.

Embodiments of the present disclosure may provide a screen display method, which is capable of correcting display data based on characteristic information of an antenna arranged on a display area of a display, and an electronic device supporting the same.

Technical Solution

According to the present disclosure, there is provided an electronic device which includes a display that outputs display data, an antenna arranged on a display area of the display, at least one processor electrically connected to the display, and a memory electrically connected to the processor, where the memory stores instructions that, when executed, cause the processor to correct the display data based on characteristic information of the antenna when a display location of the display data overlaps an arranged location of the antenna when the instructions are executed.

Advantageous Effects

According to the embodiments, it may be possible to prevent a phenomenon that a screen is unnaturally displayed on the area where the display area of a display and the mounting area of an antenna overlap.

In addition, various effects that are directly or indirectly understood through the present disclosure may be provided.

MODE FOR INVENTION

Figure 1A:
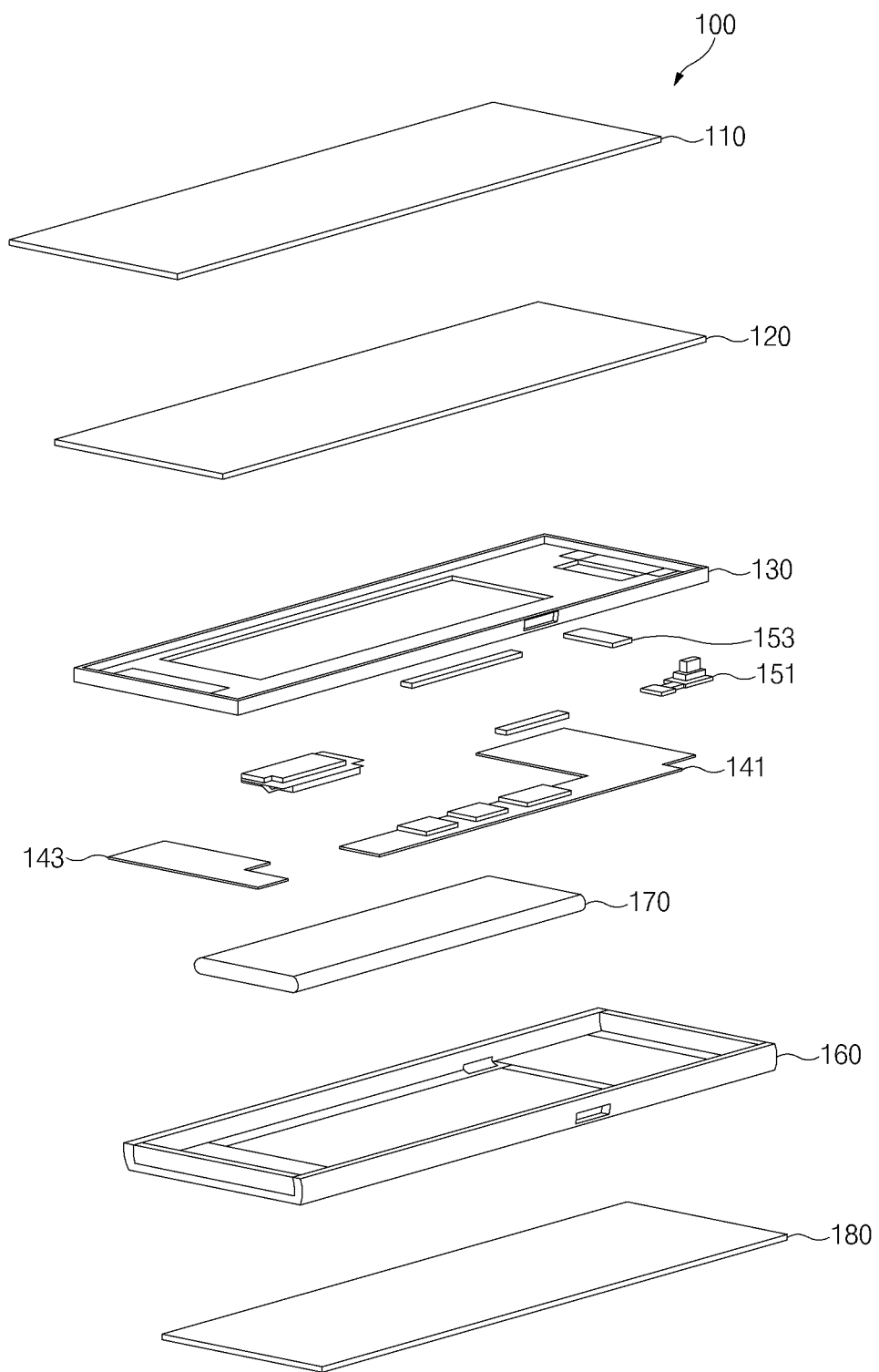
FIG. 1A is an exploded perspective view of an electronic device according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1A is an exploded perspective view of an electronic device according to an embodiment.

Referring to FIG. 1A, an electronic device 100 may include a display module 110, a ground member 120, a bracket 130, a printed circuit board (e.g., a first printed circuit board 141 and a second printed circuit board 143), a functional module (e.g., a camera 151 and a receiver 153), a housing 160, a battery 170, and a rear cover 180. According to various embodiments, a front cover may be provided on the display module 110 in a covering form. For example, the front cover may form a front outer appearance of the electronic device 100. According to an embodiment, at least a partial area of the front cover is provided of a transparent material (e.g., glass) such that a screen output through the display module 110 may be displayed externally through a transparent area of the front cover.

The display module 110 may display various contents (e.g., a text, an image, a video, an icon, a symbol, and the like) for a user. In addition, the display module 110 may include a touch screen and may receive, for example, a touch, gesture, proximity, or hovering input using an electronic pen or a user's body part. According to various embodiments, the display module 110 may be provided in multiple layers. According to an embodiment, the display module 110 may include a touch sensing layer, a display layer, or a pressure sensing layer. However, it is not limited thereto. According to various embodiments, the display module 110 may omit at least one of the layers described above, and may further include at least one other layer (e.g., an antenna layer or a fingerprint recognition layer, or the like).

For example, the touch sensing layer may include a touch sensor capable of sensing contact or approach of a touch object (e.g., an electronic pen or a part of a user body). According to an embodiment, the touch sensing layer may be provided in the form of a panel, which may be referred to as a touch panel. The touch sensor may include a conductive material, and may be arranged in a horizontal axis (or x axis) and a vertical axis (or y axis) to form a lattice structure.

The display layer may be provided in the form of a panel, and may be referred to as a display panel. The structure and the shape of the display panel may be different depending on a scheme of expressing colors. The display panel includes a polymer layer, a plurality of display elements coupled on one surface of the polymer layer, and at least one conductive line coupled with the polymer layer and electrically connected to the plurality of display elements. According to an embodiment, the polymer layer may include polyimide. The plurality of display elements may be arranged in a matrix on one side of the polymer layer to form pixels of the display panel and may include a fluorescent material, an organic fluorescent material, or the like capable of expressing colors. According to an embodiment, the plurality of display elements may include an organic light emitting diode (OLED). The conductive line may include at least one gate signal line or at least one data signal line. According to an embodiment, a plurality of gate signal lines and a plurality of data signal lines may be arranged in a matrix, and electrically connected to the plurality of display elements aligned to be adjacent to points where lines intersect.

According to various embodiments, the display panel may be connected to a display driver IC (DDI). The DDI may be electrically connected to the conductive line. The DDI may include a driver IC for providing a driving signal and a video signal to the display panel, or a timing controller (T-con) for controlling the driving signal and the video signal. The driver IC may include a gate driver IC for sequentially selecting a gate signal line of the display panel and applying a scan signal (or a driving signal), and a data driver IC (or a source driver IC) for applying a video signal to a data signal line of the display panel. According to an embodiment, when the gate driver IC selects the gate signal line and applies the scan signal to change the corresponding display element into an active state, the data driver IC may apply the video signal to the corresponding display element through the data signal line. The timing controller may prevent a display time difference, which is generated during the process of outputting a signal to the display panel, by adjusting a transmission time of the signal transmitted to the driver IC.

For example, the pressure sensing layer may detect a pressure applied from an outside and convert the pressure into an electric signal that is usable for measurement or control. According to an embodiment, the pressure sensing layer may include a pressure sensor. According to another embodiment, the pressure sensing layer may include a piezoelectric element (e.g., a piezo sensor).

The ground member 120 may be formed of a conductive material to provide a ground area. According to an embodiment, the ground member 120 may be electrically connected to the display module 110 to provide the ground area. According to various embodiments, the ground member 120 may block heat or electromagnetic waves generated from the display module 110 from being introduced into the printed circuit board, or may block heat or electromagnetic waves generated from the printed circuit board from being introduced into the display module 110.

The bracket 130 may include an insulating material, and may provide a space which contains at least a portion of the display module 110 or the functional module. According to an embodiment, the bracket 130 may be coated with an adhesive material or may include an adhesive layer in some areas such that at least a portion of the display module 110 or the functional module may be fixed. According to an embodiment, the display module 110 may be placed on a front surface of the bracket 130 and the front cover may be coupled in the form of covering a portion of the front surface of the bracket 130.

According to various embodiments, the bracket 130 may include at least one opening. According to an embodiment, at least one of the functional modules may be connected to the printed circuit board through the at least one opening formed in the bracket 130. According to various embodiments, the bracket 130 may be formed with one opening in an area except for an edge area, and in another embodiment, the number, type, position, and the like of the openings of the bracket 130 may be differently formed depending on the number, type, position, and the like of the modules connected to the printed circuit board among the functional modules.

The printed circuit board may be arranged on a lower layer of the bracket 130, and various electronic parts may be mounted on the printed circuit board. For example, at least one electronic element or circuit line or the like may be mounted on the printed circuit board, and at least some may be electrically connected to each other. The electronic parts may include, for example, a processor, a memory, a communication module (e.g., a communication circuit), a functional module (e.g., the camera 151, the receiver 153, and the like), and the like.

According to various embodiments, the printed circuit board may be provided integrally or plurally. The drawings illustrate a state where the first printed circuit board 141 and the second printed circuit board 143 are provided. According to an embodiment, the first and second printed circuit boards 141 and 143 may be electrically connected to each other.

The functional module may perform at least one of the functions provided by the electronic device 100. For example, the functional module may include the camera 151 that performs a photographing function, or a receiver 153 (or a speaker) that outputs sound. According to various embodiments, the functional module may include a microphone for processing an input sound, a USB connector for performing an interface function for hardware communication between external electronic devices, an earphone receptacle, a SIM socket, and the like.

According to various embodiments, at least one of the functional modules may face the display module 110 through the opening formed in the bracket 130. In this case, although not illustrated, the ground member 120 may have an opening formed at a position aligned with the functional module.

The housing 160 may fix and support internal components of the electronic device 100. According to an embodiment, the display module 110, the bracket 130, and the printed circuit board may be stacked in order and placed in the housing 160. In addition, at least one of the functional modules may be placed in and fixed to the housing 160. According to various embodiments, the housing 160 may include a front surface, a rear surface, and a side surface that at least partially surrounds the space between the front surface and the rear surface. According to an embodiment, the housing 160 may be formed with an opening passing through the front and rear surfaces such that the battery 170 is detachably attached thereto, but the embodiment is not limited thereto. In an embodiment, the battery 170 may be provided integrally so that no openings passing through the front and rear surfaces are formed. According to various embodiments, the housing 160 may be formed on the side surface thereof with at least one through-hole (or an inter-facing hole). According to an embodiment, at least one of the functional modules may be exposed to an outside through the through-hole.

According to various embodiments, the housing 160 may include a metallic material on at least one side. According to an embodiment, the housing 160 may include a metal frame on a side thereof. According to various embodiments, the front cover may be detachably attached to the housing 160. According to an embodiment, the front cover may be fastened to a portion of a side surface of the housing 160 while covering the front surface of the housing 160.

The battery 170 may supply power to the electronic device 100. For example, the battery 170 may be electrically connected to the printed circuit board. According to an embodiment, the battery 170 may be placed inside the housing 160. According to various embodiments, the battery 170 may be provided integrally with the electronic device 100, or may be detachably provided.

The rear cover 180 may form a rear outer appearance of the electronic device 100. According to various embodiments, the rear cover 180 may be detachably attached to the housing 160. According to an embodiment, the rear cover 180 may be fastened to a portion of the side surface of the housing 160 while covering the rear surface of the housing 160.

According to various embodiments, the electronic device 100 may omit at least one of the components described above, or may further include at least one other component. According to an embodiment, the electronic device 100 may not include the back cover 180. In this case, the rear surface of the housing 160 may form the rear outer appearance of the electronic device 100.

Figure 1B:
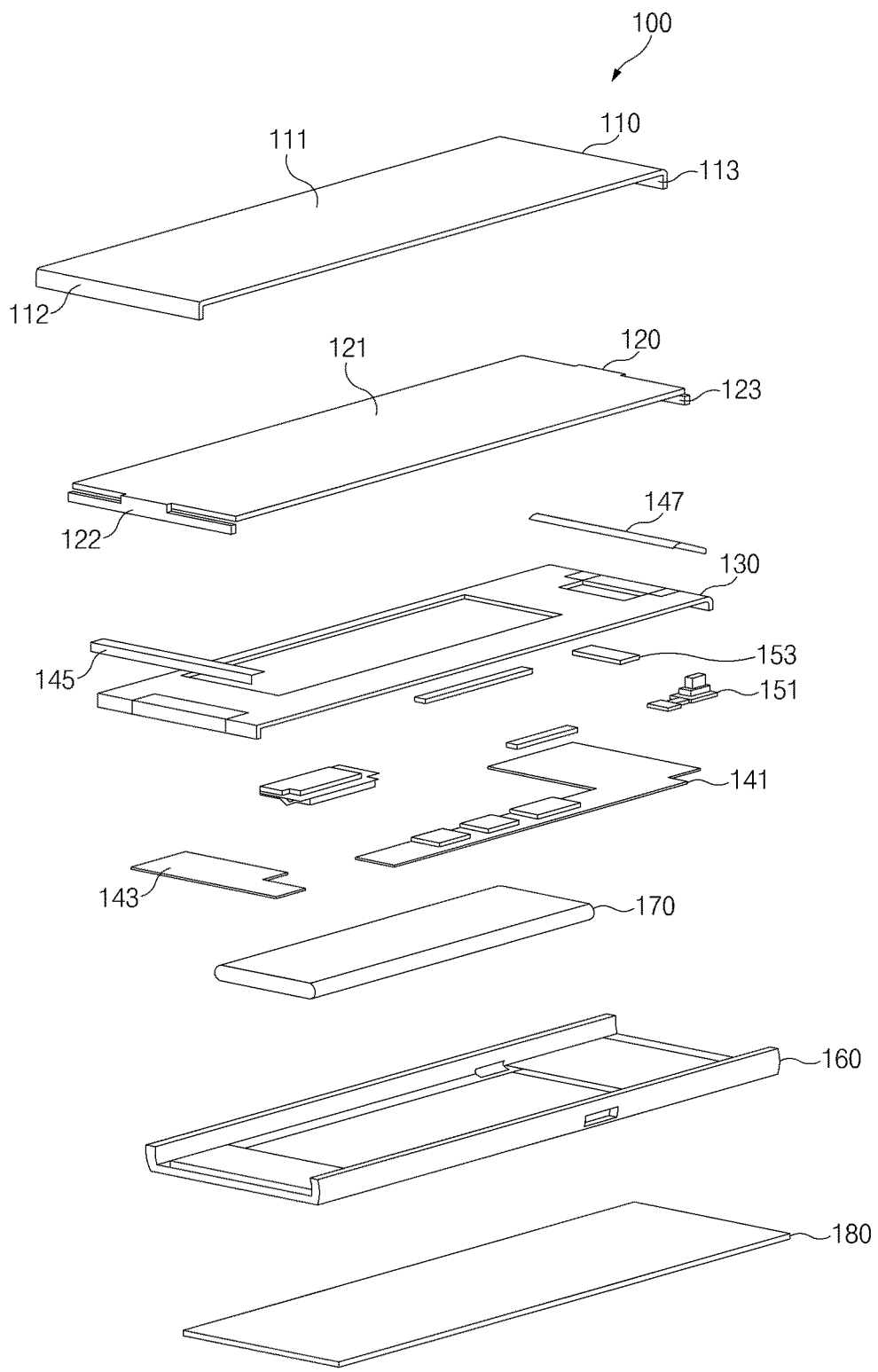
FIG. 1B is an exploded perspective view of an electronic device in which a display area is enlarged at least toward one side surface according to an embodiment.

FIG. 1B is an exploded perspective view of an electronic device according to an embodiment, in which a display area is enlarged at least toward one side surface.

According to various embodiments, the display module 110 may be formed on at least one side surface of the electronic device 100 as well as the front surface. Referring to FIG. 1B, the display module 110 of the electronic device 100 may include a front portion 111, a lower side portion 112 extending from a lower end of the front portion 111 and bent in a rear direction of the housing 160, and an upper side portion 113 extending from an upper end of the front portion 111 and bent in the rear direction of the housing 160. However, the embodiment is not limited thereto. In an embodiment, the display module 110 may further include a left side portion or a right side portion.

According to various embodiments, the display module 110 may be extended to at least one side surface of the electronic device 100 so that the configuration of other components included in the electronic device 100 is also provided partially differently from that described in FIG. 1A. For example, the ground member 120 also includes a front portion 121, a lower side portion 122 extending from a portion of a lower end of the front portion 121 and formed in parallel with the lower side portion 112 of the display module 110, and an upper side portion 123 extending from a portion of an upper end of the front portion 121 and formed in parallel with the upper side portion 113 of the display module 110. However, the lower side portion 122 and the upper side portion 123 of the ground member 120 may be provided in partially different shapes from the lower side portion 112 and the upper side portion 113 of the display module 110. According to an embodiment, the lower side portion 122 and the upper side portion 123 of the ground member 120 may include a slot-shaped opening in an area connecting with the front portion 121. In the drawing, the lower side portion 122 and the upper side portion 123 have openings formed in the left and right areas are connected to the front portion 121, respectively.

In addition, the electronic device 100 may further include a first feeder electrically connected to the lower side portion 112 of the display module 110 to supply power and a second feeder electrically connected to the upper side portion 113 to supply power. According to various embodiments, the first and second feeders may be implemented on a flexible printed circuit board. In the drawing, the first feeder is implemented on a first flexible printed circuit board 145 and the second feeder is implemented on a second flexible printed circuit board 147. According to an embodiment, the first and second flexible printed circuit boards 145 and 147 may be provided in a curved shape, and curved areas may be aligned with openings formed in the lower and upper side portions 122 and 123 of the ground member 120. Thus, the first feeder may be electrically connected to the lower side portion 112 of the display module 110 through the opening formed in the lower side portion 122 of the ground member 120, and the second feeder may be electrically connected to the upper side portion 113 of the display module 110 through the opening formed in the upper side portion 123 of the ground member 120.

According to various embodiments, the first and second flexible printed circuit boards 145 and 147 may be placed on the bracket 130 while partially covering the upper and lower ends and a side surface of the bracket 130. According to various embodiments, portions of the upper and lower ends of the bracket 130 may be provided in a curved shape. According to various embodiments, the first and second flexible printed circuit boards 145 and 147 may be electrically connected to the first or second printed circuit board 141 or 143.

According to various embodiments, the display module 110 may extend to at least one side surface of the electronic device 100 so that the shape of the housing 160 is provided partially differently from that described in FIG. 1A. For example, the housing 160 may not have upper and lower side surfaces among the side surfaces.

Figure 2A:
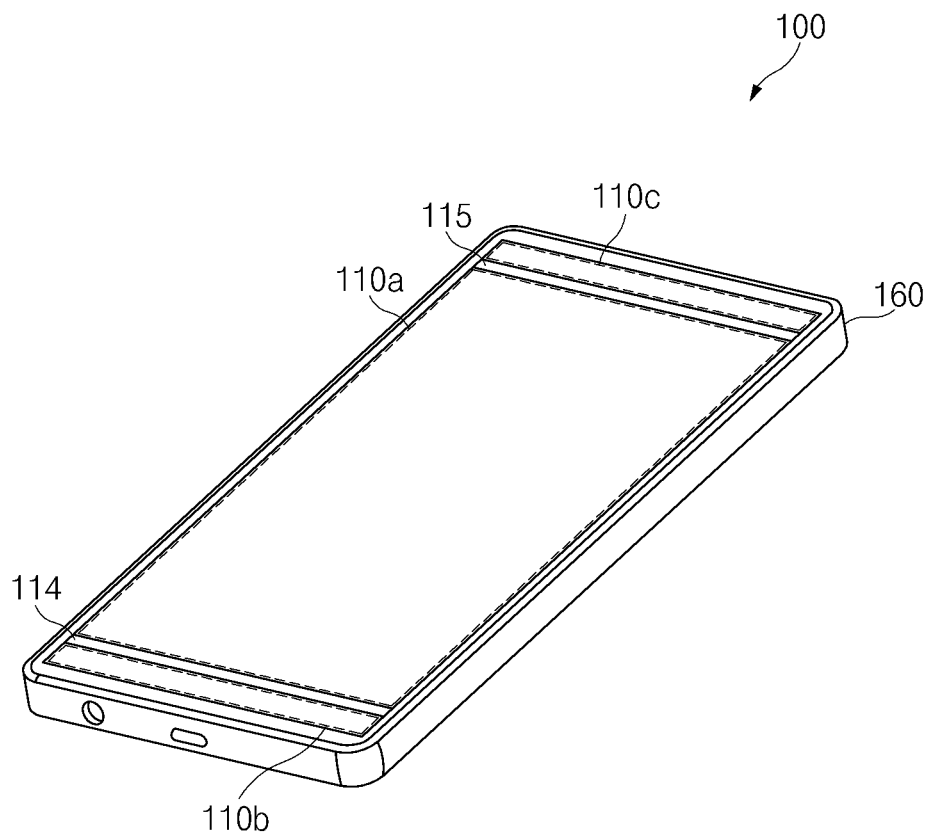
FIG. 2A is a perspective view of an electronic device in which a display area according to an embodiment is logically divided.
Figure 2B:
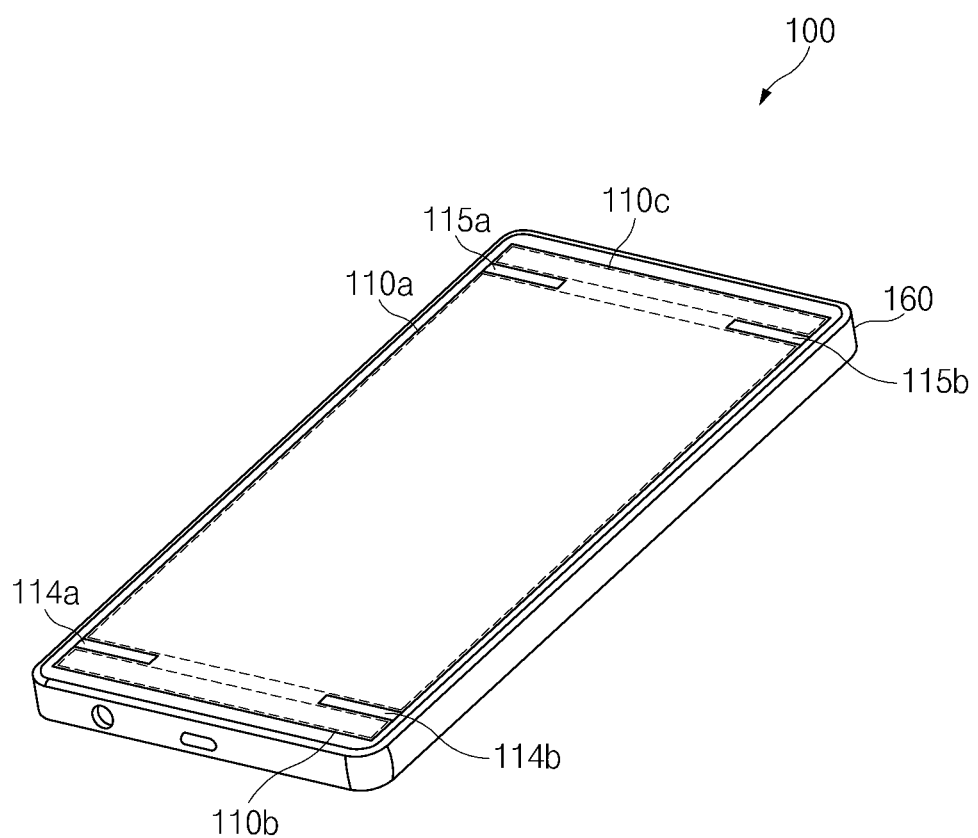
FIG. 2B is a perspective view of an electronic device in which a display area according to an embodiment is logically divided in another form.

FIG. 2A is a perspective view of an electronic device in which a display area according to an embodiment is logically divided. FIG. 2B is a perspective view of an electronic device in which a display area according to an embodiment is logically divided in another form.

Referring to FIGS. 2A and 2B, the entire surface of a display module (e.g., the display module 110) of the electronic device 100 may be displayed as an execution screen of an activated application (e.g., an application that occupies a foreground), and may be divided into a plurality of areas to be displayed as an execution screen of at least one application. According to an embodiment, the display module may be divided into a main display area 110a, a first sub-display area 110b, and a second sub-display area 110c. According to various embodiments, the main display area 110a, which is a central area of the display module, may have a ratio of the vertical length to the horizontal length of 16:9. The first sub-display area 110b may be formed in a lower end area of the display module and the second sub-display area 110c may be formed in an upper end area of the display module. However, the embodiment is not limited thereto. A ratio of each area to the entire area may be selectively changed. At least one of the first or second sub-display area 110b or 110c may be omitted, and at least one other sub-display area (e.g., a third sub-display area) may be further added.

According to various embodiments, a display area of the display module may be utilized as an antenna radiator by adding a non-conductive area to a portion of the display module or removing a conductive area. According to an embodiment, a feeder may be provided into a non-conductive area to feed power, or an antenna structure may be formed in which the feeder and the antenna are closely coupled to each other. In this case, the conductive area of the display module does not serve to shield the antenna radiation area, but the sub-display area including the non-conductive area may be utilized as a coupling-resonant antenna radiator.

In FIG. 2A, a first non-conductive member 114 is added to a lower end of the display module, and a second non-conductive member 115 is added to an upper end of the display module. When a feeder is added to a portion of the first or second non-conductive member 114 or 115, a conductive member formed in the first or second sub-display area 110b or 110c may be utilized as an antenna radiator. According to various embodiments, when the housing 160 includes a conductive material (e.g., a metal housing) and the conductive material is utilized as an antenna radiator, the conductive material may be electrically connected to the conductive member formed in the first or second sub-display area 110b or 110c to form an antenna.

In FIG. 2B, a conductive area is removed in a slot shape in an edge area, for example, a left upper end area, a left lower end area, a right upper end area, and a right lower end area of the display module. For example, the display module may be formed with a first slot 114a in the left lower end area, a second slot 114b in the right lower end area, a third slot 115a in the left upper end area, and a fourth slot 115b in the right upper end area. In this case, individual antenna radiators may be configured through each slot.

According to various embodiments, the electronic device 100 may output an execution screen of an application to the main display area 110a and may display an additional function, such as a time display function, a battery remaining amount display function, or a soft key implemented in software (e.g., a home button), and the like, in the first or second sub-display area 110b or 110c.

Figure 2C:
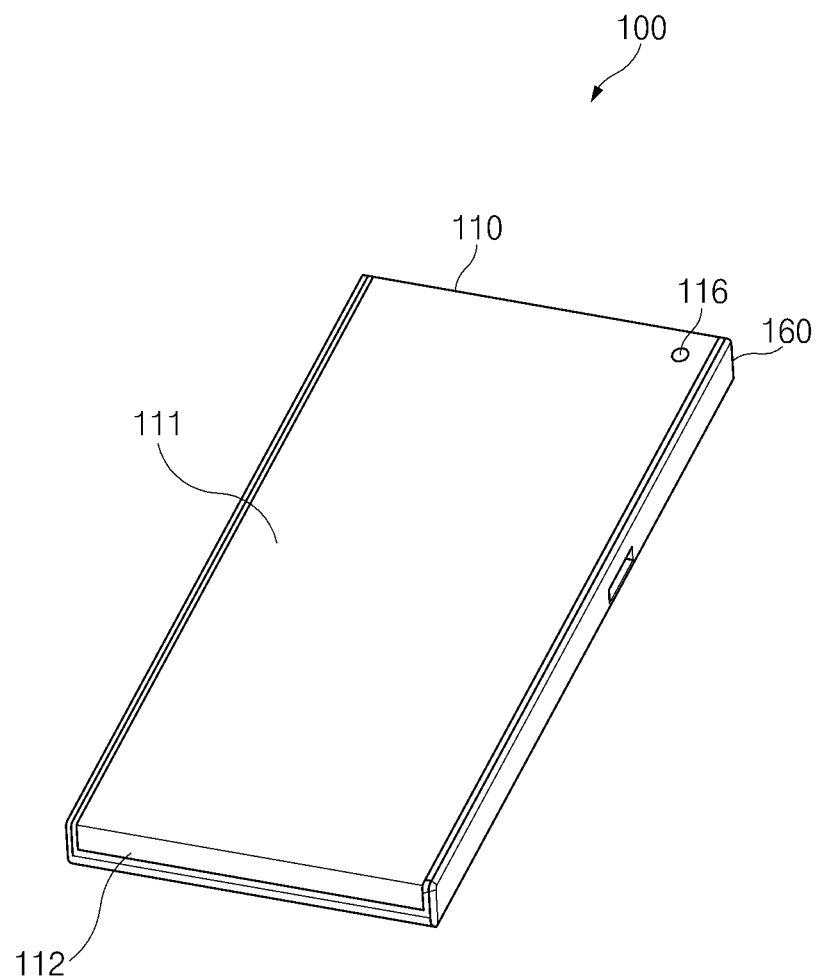
FIG. 2C is a coupling perspective view of the electronic device of FIG. 1B according to an embodiment.
Figure 2D:
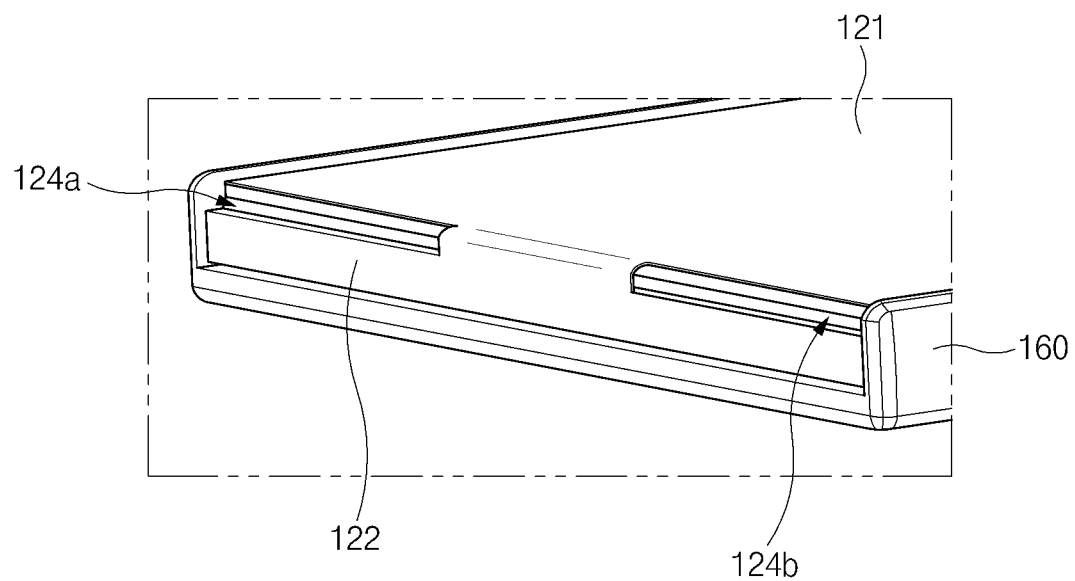
FIG. 2D is an enlarged view of a portion of the electronic device of FIG. 2C according to an embodiment.

FIG. 2C is a coupling perspective view of the electronic device of FIG. 1B according to an embodiment. FIG. 2D is an enlarged view of a portion of the electronic device of FIG. 2C according to an embodiment.

Referring to FIGS. 2C and 2D, the electronic device 100 may extend the display module 110 to a front surface and a portion of a side surface of the electronic device 100, and utilize the extended display area as the radiator of an antenna. For example, the conductive member of the display module 110 having an electrical conductivity of a certain size or larger that can be operated as an antenna radiator may be utilized as an antenna radiator. According to an embodiment, a partial area of the conductive member of the display module 110 may be replaced with a non-conductive member or removed to form a slot. Although not illustrated, a slot may be formed inside a specified area where the front portion 111 and the lower side portion 112 of the display module 110 are connected. In this case, the antenna may be constituted by the first conductive member included in the front portion 111 of the display module 110 and the second conductive member included in the lower side portion 112. According to an embodiment, an antenna radiation feeder including the second conductive member may be formed at a point of the slot. The feeder may be included in the second conductive member, or may be formed in a separate circuit to be electrically connected to the second conductive member. An RF signal transmitted from the communication circuit through a transmission line may be transmitted to the second conductive member formed in a specific slot through the feeder. Therefore, the second conductive member including the slot area may perform a function of an antenna as an antenna radiator. In addition, the slot area, which is a non-conductive area, may be formed in the outermost corner area of the display module 110.

According to various embodiments, the feeder, the antenna radiator, and the antenna ground area may exist in the front portion 111 of the display module 110 and the lower side portion 112 extending from the front portion 111. According to an embodiment, slots or non-conductive areas may be formed on the left and right corners based on the front portion 111 of the display module 110, respectively, and independent antennas may be formed when feeders are formed on them, respectively. According to various embodiments, the second conductive member of the lower side portion 112, which is utilized as an antenna radiator, may be in contact with the inner surface of the housing 160 constituting the outer appearance. The housing 160 may include a non-conductive material (e.g., glass) or a conductive material (e.g., metal).

According to various embodiments, the front portion 111 of the display module 110 is used as a ground area to which the ground point of the transmission line is connected, and the lower side portion 112 may be connected to the feeding line of the transmission line so that the lower side portion 112 is utilized as an antenna radiator. For example, the resonance frequency of an antenna may be determined corresponding to the electrical length of the second conductive member formed on the lower side portion 112. The corresponding structure may constitute an IFA, loop, or slot antenna, depending on the internal configuration scheme. According to various embodiments, the second conductive member may be connected to an external radiator to extend the antenna radiator. For example, the resonance frequency may be controlled by connecting a portion of the second conductive member to a portion of the housing 160 made of a metal material.

According to various embodiments, a ground member (for example, the ground member 120) arranged on the lower layer of the display module 110 may be provided to correspond to the shape of the display module 110. According to an embodiment, the ground member may include the front portion 121 that is parallel with the front portion 111 of the display module 110, and the lower side portion 122 that extends from a lower end portion of the front portion 121 and is formed in parallel with the lower side portion 112 of the display module 110. Although not illustrated, the ground member may further include an upper side portion (e.g., the upper side portion 123) extending from an upper end portion of the front portion 121 of the ground member and formed in parallel with the upper side portion 113 of the display module 110.

According to various embodiments, the ground member may include openings of a slot shape formed in the front portion 121 and the lower side portion 122, or the front portion 121 and in an area connected to the upper side portion. In the drawings, first and second openings 124*a* and 124*b* are formed in left and right areas where the front portion 121 and the lower side portion 122 are connected. According to various embodiments, the antenna radiator formed on the display module 110 and the feeder may be electrically connected through the opening of the ground member.

Figure 2E:
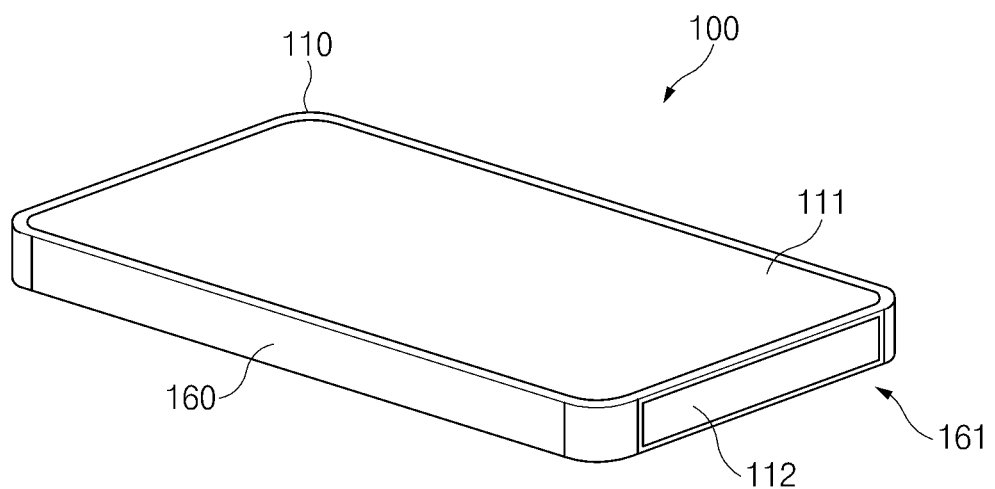
FIG. 2E is a perspective view of an electronic device including a physically separated sub-display module according to an embodiment.

FIG. 2E is a perspective view of an electronic device including a physically separated sub-display module according to an embodiment.

Referring to FIG. 2E, the display module 110 may include a physically separated sub-display module. As shown in the drawing, the lower side portion 112 of the display module 110 may be provided as the sub-display module physically separated from the front portion 111. In this case, an opening may be formed on the lower side surface of the housing 160, and the sub-display module may be exposed to an outside through the opening. According to various embodiments, an edge of the lower side surface of the housing 160 is provided with a non-conductive material to electrically separate the sub-display module formed on the lower side portion 112 from the front portion 111 of the display module 110.

Figure 2F:
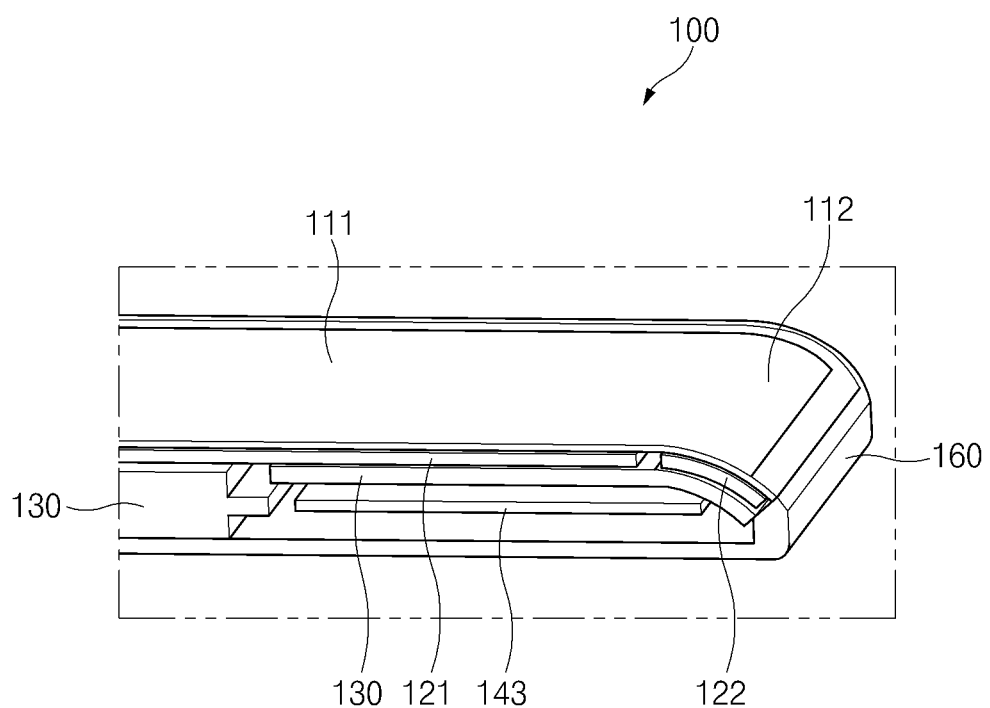
FIG. 2F is a sectional view of a portion of an electronic device in which a portion of a display module according to an embodiment is formed in a curved shape.

FIG. 2F is a sectional view of a portion of an electronic device in which a portion of a display module according to an embodiment is formed in a curved shape.

Referring to FIG. 2F, the electronic device 100 may include a display module (e.g., the display module 110) of which a portion is curved. As illustrated in the drawing, the lower side portion 112 extending from the front portion 111 of the display module may be curved. When the portion of the display module is curved, a portion of a ground member (e.g., the ground member 120) arranged on a lower layer of the display module may also be curved. For example, the lower side portion 122 of the ground member may also be curved to correspond to the lower side portion 112 of the display module. The drawing illustrates a portion of the bracket 130 that is curved.

According to various embodiments, in the electronic device 100, the display module 110 may occupy all the front surface of the electronic device 100 or most of the front surface of the electronic device 100 except for a part of the front surface of the electronic device 100. Accordingly, the functional module to be exposed to an outside through the front surface of the electronic device 100 may be improved in usability by a software or hardware method. In the following description, the software or hardware method will be described in detail with reference to FIGS. 3A to 3C.

Figure 3A:
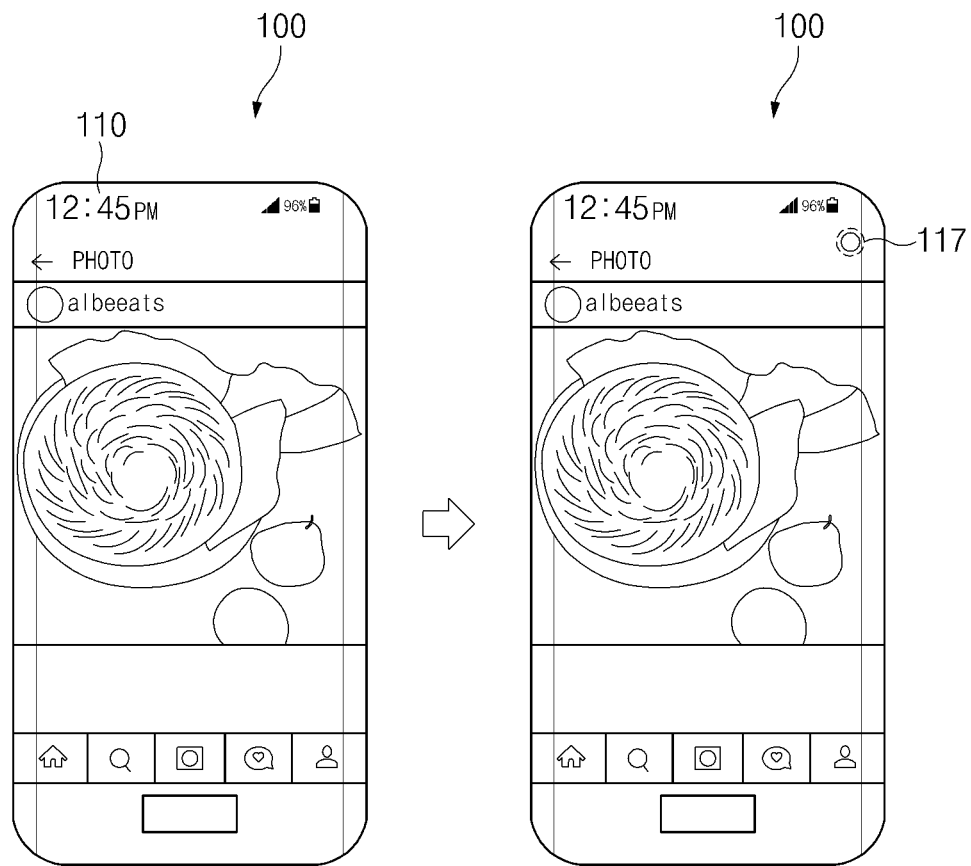
FIG. 3A is a diagram illustrating a screen display method that enables use of a functional module overlapped with a display area according to an embodiment.

FIG. 3A is a diagram illustrating a screen display method that enables use of a functional module overlapped with a display area according to an embodiment.

Referring to FIG. 3A, when displaying a screen on a display module 110, the electronic device 100 may selectively display an area 117 overlapped with the area of a functional module (for example, the camera 151) arranged inside the electronic device 100. According to an embodiment, even though the functional module is in an inactive or active state, when not in use, the screen may be output to the overlapped area 117. However, when the functional module is in use, the screen may not be output to the overlapped area 117. According to various embodiments, the electronic device 100 may control the transparency of the overlapped area 117 to allow the functional module to be exposed to an outside. For example, when the functional module is in an inactive or active state but not in use, the transparency of the overlapped area 117 is lowered to display an image. When the functional module is in use, the functional module may be controlled to allow the transparency of the overlapped area 117 to be increased so that the functional module is exposed to an outside.

Figure 3B:
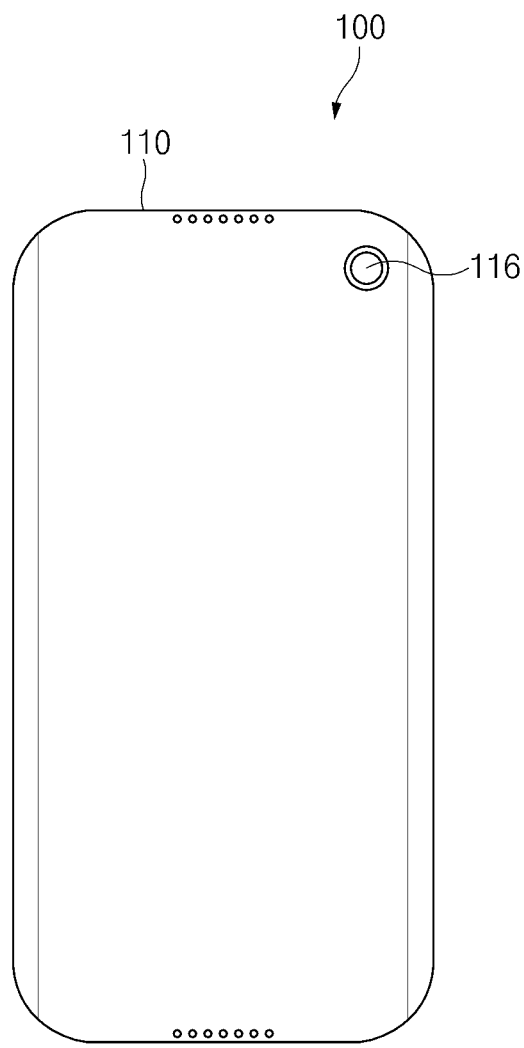
FIG. 3B is a view of an electronic device in which an opening is formed in a portion of a display module according to an embodiment.
Figure 3C:
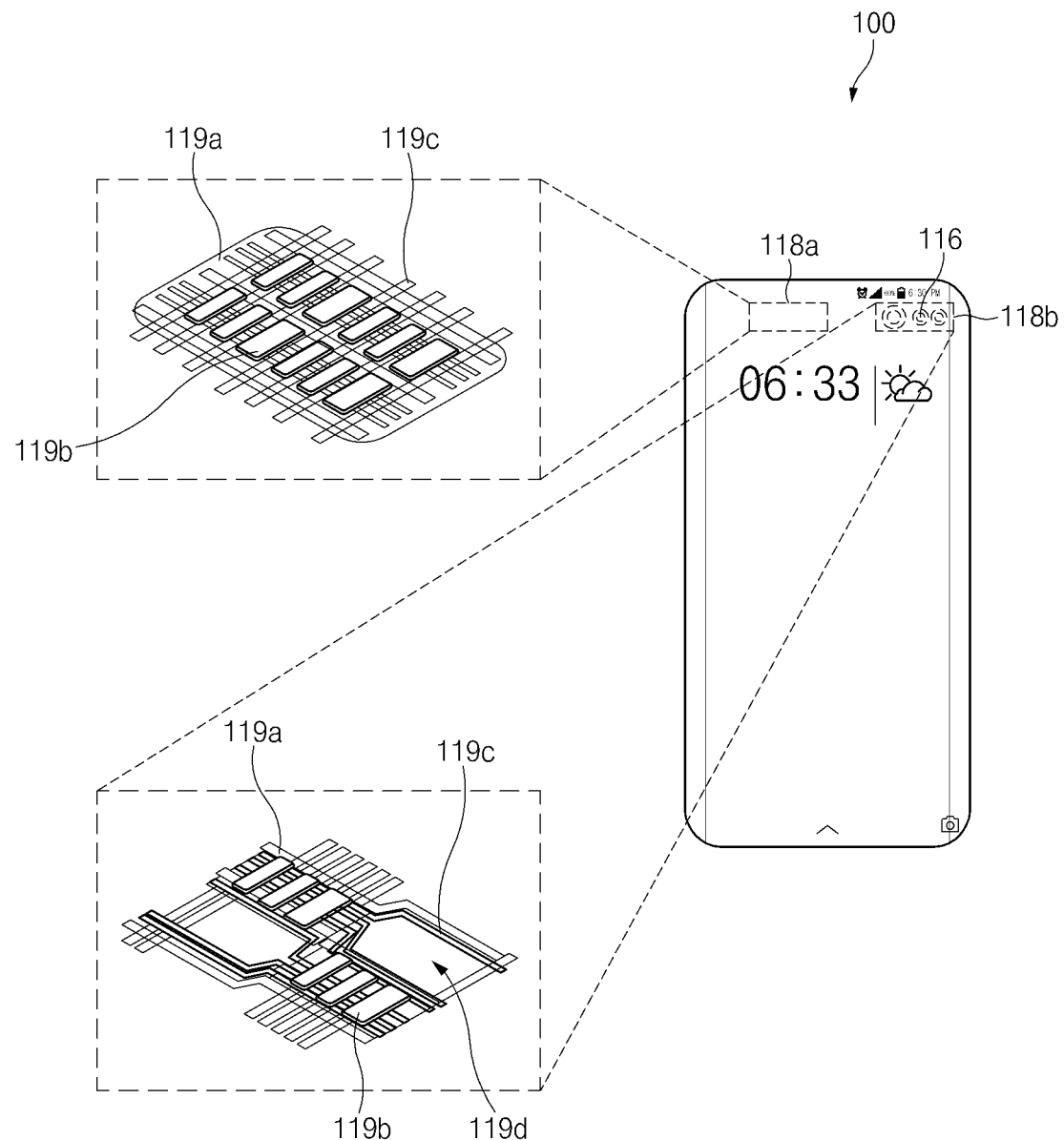
FIG. 3C is a view illustrating a shape of a display panel for the electronic device of FIG. 3B according to an embodiment.

FIG. 3B is a view of an electronic device in which an opening is formed in a portion of a display module according to an embodiment. FIG. 3C is a view illustrating a shape of a display panel for the electronic device of FIG. 3B according to an embodiment.

Referring to FIGS. 3B and 3C, the electronic device 100 may include an opening 116 in a portion of the display module 110. According to an embodiment, the display module 110 may be provided with the opening 116 in an area overlapped with an area of a functional module (e.g., the camera 151) arranged inside the electronic device 100. Accordingly, the functional module may be exposed to an outside through the opening 116.

According to various embodiments, in the display module 110, in an area 118*a* in which the functional module is not overlapped (e.g., an area where the opening 116 is not formed), display elements 119*b* formed on a display panel 119*a* may be arranged in a matrix form, and conductive lines 119*c* may be electrically connected to the display elements 119*b*.

According to various embodiments, in the display module 110, in an area 118*b* in which the functional module is overlapped (e.g., an area where the opening 116 is formed), the display panel 119*a* may include a transmissive area 119*d* in an area overlapped with the opening 116. According to various embodiments, the transmissive area 119*d* may be configured to allow light to transmit more than other areas. According to an embodiment, the display panel 119*a* has only a minimum number of conductive lines 119*c* connecting the transmissive area 119*d*, and other components (e.g., the display element 119*b*) may be omitted. According to various embodiments, the display panel 119*a* may be arranged to allow the conductive line 119*c* connected to the transmissive area 119*d* to bypass the transmissive area 119*d*. In an embodiment, the display panel 119*a* may the area through which the conductive line 119*c* connected to the transmissive area 119*d* is exposed by arranging the conductive line 119*c* in a vertical direction of the display panel 119*a*. According to various embodiments, the conductive line 119*c* on the display panel 119*a*, which is connected to the transmissive area 119*d*, may be formed of a transparent material (e.g., ITO, AgnW, graphene, and the like). According to various embodiments, the width and thickness of the conductive line 119*c* connected to the transmissive area 119*d* may be different from the width and thickness of the conductive line 119*c* in another area. In this case, the resistances of the lines may be made to match with each other. According to various embodiments, the display panel 119*a* may be configured such that the number of effective pixels in the transmissive area 119*d* may be smaller than that of other area, or the area of the effective pixels may be smaller than that of other area.

Figure 4:
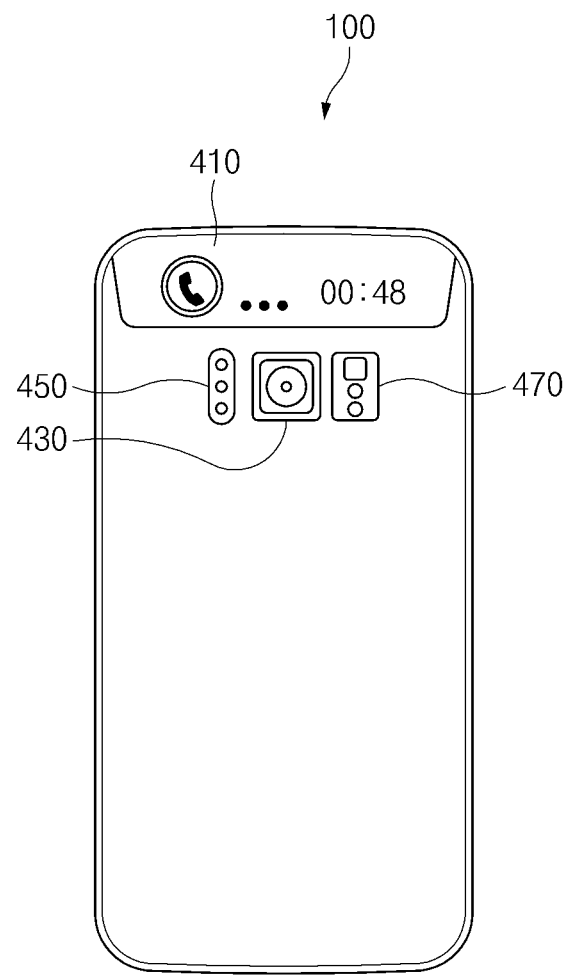
FIG. 4 is a view illustrating a sub-display module arranged on the rear surface of an electronic device according to an embodiment.

FIG. 4 is a view illustrating a sub-display module arranged on the rear surface of an electronic device according to an embodiment.

Referring to FIG. 4, in the electronic device 100, a sub-display module 410 may be arranged on the rear surface of the electronic device 100. In the drawing, the sub-display module 410 is formed on an upper end of the rear surface of the electronic device 100.

According to various embodiments, the sub-display module 410 may output a screen by interworking with other functional modules (e.g., a rear camera 430, a receiver 450, an HRM sensor 470, and the like) arranged on the rear surface of the electronic device 100. According to an embodiment, the electronic device 100 may output a screen associated with a call receiving function to the sub-display module 410 when receiving a telephone call. In addition, when the electronic device 100 acquires user's biometric information through the HRM sensor 470, the electronic device 100 may output a screen associated with the user's health status measurement function to the sub-display module 410.

Figure 5:
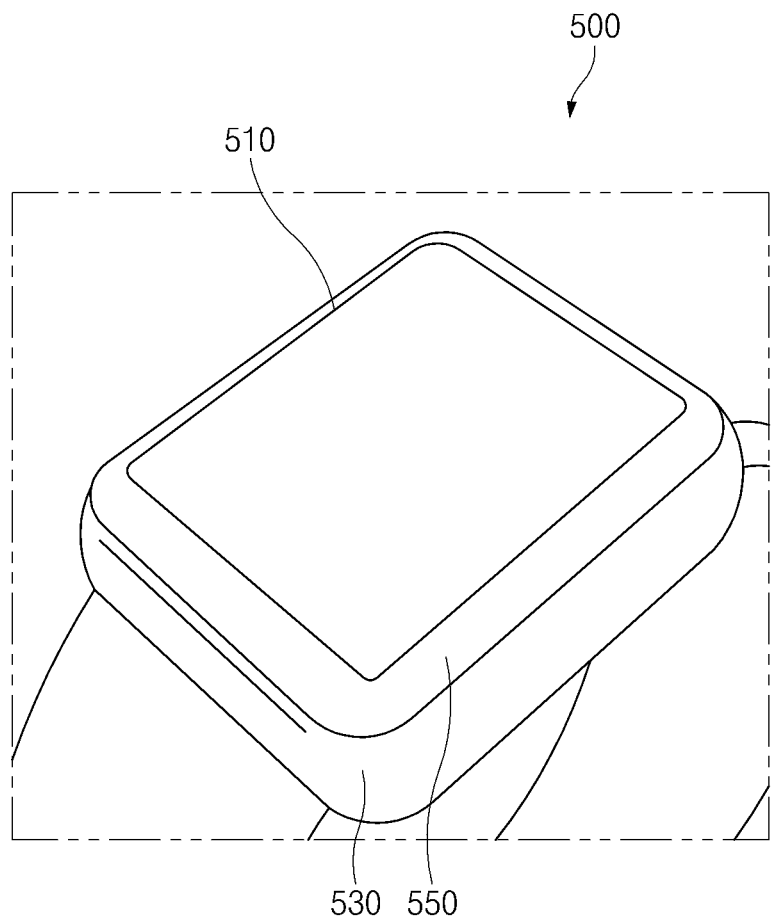
FIG. 5 is a partial perspective view of a wearable electronic device according to an embodiment.

FIG. 5 is a partial perspective view of a wearable electronic device according to an embodiment.

Referring to FIG. 5, a wearable electronic device 500 (e.g., a smart watch) may include a display module 510, a housing 530, and an insulating member 550. According to various embodiments, the wearable electronic device 500 may include components that are the same as or similar to those of the electronic device 100 described above.

According to various embodiments, the housing 530 may include a conductive material (e.g., metal) which is utilized as an antenna radiator. The wearable electronic device 500 may be provided with the insulating member 550 arranged in a peripheral area of the display module 510 such that the display module 510 and a portion of the housing 530 utilized as an antenna radiator are spaced apart from each other by a specified distance. For example, the insulating member 550 may be arranged between the display module 510 and the housing 530. According to an embodiment, the insulating member 550 may include glass. In an embodiment, the insulating member 550 may include a plastic material. In this case, the insulating member 550 may be formed in the housing 530 in an injection scheme.

According to various embodiments, the display module 510 may be arranged to protrude from the front surface of the housing 530 at a specified height, and the insulating member 550 may be arranged between the display module 510 and the housing 530 to overcome the step difference between the display module 510 and the housing 530. In this case, the insulating member 550 may have a curved surface formed from a first portion adjacent to the display module 510 to a second portion adjacent to the housing 530.

According to various embodiments, even in the case of the wearable electronic device 500, a portion of the conductive member of the display module 510 may be utilized as an antenna radiator. In addition, a portion of the conductive member of the display module 510 utilized as an antenna radiator may be connected to the conductive material of the housing 530 to form an antenna radiator.

Figure 6A:
FIG. 6A is a schematic sectional view of an electronic device including a touch panel according to an embodiment.
Figure 6B:
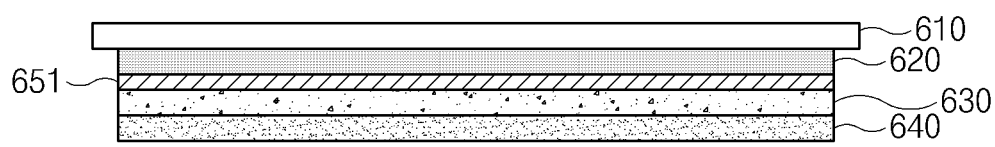
FIG. 6B is a schematic sectional view of an electronic device provided integrally with a touch panel and a front cover according to an embodiment.
Figure 6C:
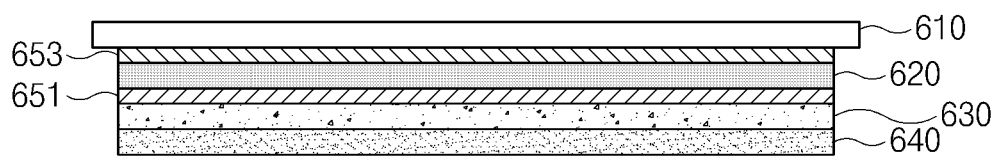
FIG. 6C is a schematic sectional view of an electronic device provided with a touch panel attached to a front cover according to an embodiment.
Figure 6D:
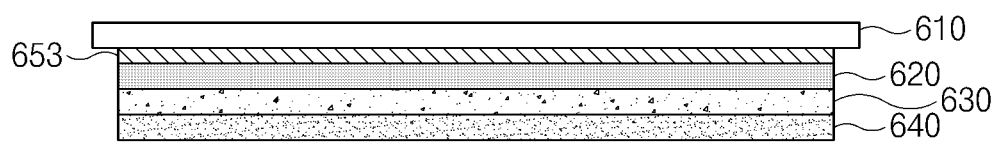
FIG. 6D is a schematic sectional view of an electronic device in which a touch panel according to an embodiment is provided on a display panel in an on-cell form.
Figure 6E:
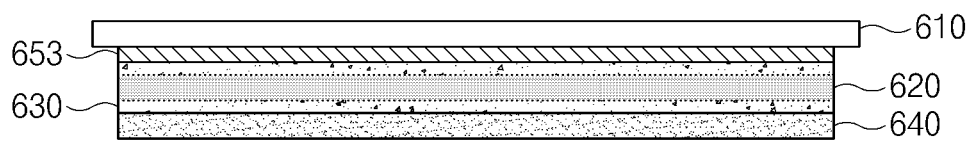
FIG. 6E is a schematic sectional view of an electronic device in which a touch panel according to an embodiment is provided on a display panel in an in-cell form.

FIG. 6A is a schematic sectional view of an electronic device including a touch panel according to an embodiment. FIG. 6B is a schematic sectional view of an electronic device provided integrally with a touch panel and a front cover according to an embodiment. FIG. 6C is a schematic sectional view of an electronic device provided with a touch panel attached to a front cover according to an embodiment. FIG. 6D is a schematic sectional view of an electronic device in which a touch panel according to an embodiment is provided on a display panel in an on-cell form. FIG. 6E is a schematic sectional view of an electronic device in which a touch panel according to an embodiment is provided on a display panel in an in-cell form.

Referring to FIGS. 6A to 6E, a front cover 610 may form a front appearance of an electronic device (e.g., the electronic device 100). A touch panel 620 may be stacked on a lower layer of the front cover 610. The touch panel 620 may be formed of a transparent conductive material (e.g., an ITO electrode). However, the embodiment is not limited thereto. The touch panel 620 may be provided by forming a small pattern to a level at which an opaque metal material is not visible to naked eyes. According to various embodiments, the touch panel 620 may be provided by a glass scheme in which an electrode is formed on a glass substrate, a film scheme in which an electrode is formed on plastic or film, and an embedding scheme in which an electrode is integrated with a display panel 630. The glass and film schemes may include an external (or add-on) scheme in which a separate layer is required between the display panel 630 and the front cover 610, and an integration scheme in which an electrode is formed on the front cover 610. As illustrated in the drawings, FIG. 6B illustrates a state in which it is implemented in the integrated scheme, and FIG. 6C illustrates a state in which it is implemented in the add-on scheme. In addition, FIGS. 6D and 6E illustrate states in which it is implemented in the embedment scheme, where FIG. 6D illustrates an on-cell type and FIG. 6E illustrates an in-cell type.

Referring to FIG. 6B, the touch panel 620 may be provided integrally with the front cover 610. According to an embodiment, Tx and Rx electrodes, which are two ITO electrode layers, may be formed on the front cover 610, and an insulating layer may be arranged in an area in which the Tx and Rx electrode are overlapped with each other, so that the Tx and Rx electrodes are separated from each other. However, the embodiment is not limited thereto. In an embodiment, one ITO electrode layer may constitute the Tx and Rx electrodes on the front cover 610, and the insulating layer may be omitted. According to various embodiments, the display panel 630 may be attached to the touch panel 620 through a first adhesive member 651 on a lower layer of the touch panel 620.

Referring to FIG. 6C, the touch panel 620 may be attached between the front cover 610 and the display panel 630 in an inserting form. According to various embodiments, the touch panel 620 may be provided in a glass or film scheme. As illustrated in the drawings, the touch panel 620 may be attached to the display panel 630 through the first adhesive member 651 and attached to the front cover 610 through a second adhesive member 653.

Referring to FIG. 6D, the touch panel 620 may be implemented directly on the display panel 630. According to an embodiment, an ITO electrode may be formed on an upper end glass of the display panel 630. In addition, the display panel 630 formed with the touch panel 620 may be attached to the front cover 610 through the second adhesive member 653.

Referring to FIG. 6E, the touch panel 620 may be formed inside the display panel 630. According to an embodiment, an ITO electrode may be formed on a thin film transistor (TFT) substrate of the display panel 630. In addition the display panel 630 in which the touch panel 620 is embedded may be attached to the front cover 610 through the second adhesive member 653.

According to various embodiments, a pressure sensor 640 may be attached to a lower layer of the display panel 630. According to various embodiments, the pressure sensor 640 may be formed on the same layer as the touch panel 620, and in an embodiment, may be stacked on or below the touch panel 620, so that the pressure sensor 640 is formed in a layer higher than the display panel 630. According to various embodiments, a digitizer may be formed in a lower layer of the pressure sensor 640. The digitizer may sense the approach or contact of an electronic pen (e.g., a stylus) that supports an electromagnetic resonance (EMR) scheme. According to an embodiment, the digitizer may include a conductive circuit pattern capable of sensing external electromagnetic force. For example, the digitizer may sense the electromagnetic force emitted from the stylus based on the conductive circuit pattern, and support to determine a point, at which the sensed electromagnetic force is greatest, as touch coordinates. In an embodiment, the pressure sensor 640 may replace the function of the digitizer. For example, the pressure sensor 640 may sense a pressure generated in a pressing operation by a touch object (e.g., an electronic pen or a part of a user body) and support to determine a point, at which the sensed pressure is greatest, as touch coordinates.

Figure 7A:
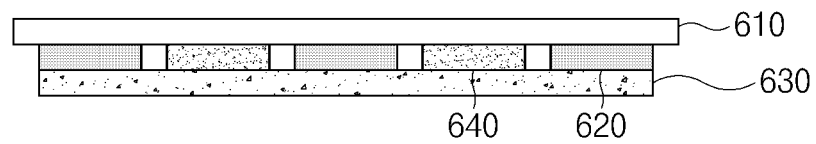
FIG. 7A is a schematic sectional view of an electronic device in which a pressure sensor is formed on the same layer as a touch panel according to an embodiment.
Figure 7B:
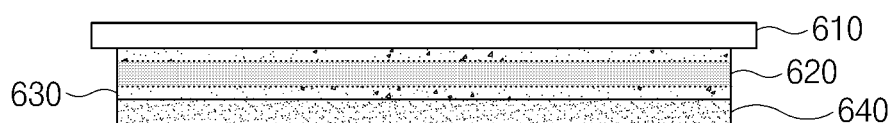
FIG. 7B is a schematic sectional view of an electronic device including a touch panel provided in a display panel in an in-cell form and a pressure sensor according to an embodiment.
Figure 7C:
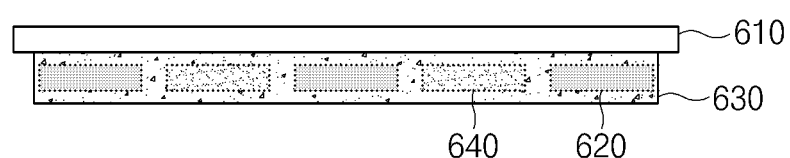
FIG. 7C is a schematic sectional view of an electronic device in which a touch panel and a pressure sensor are provided on a display panel in an in-cell form according to an embodiment.

FIG. 7A is a schematic sectional view of an electronic device in which a pressure sensor is formed on the same layer as a touch panel according to an embodiment. FIG. 7B is a schematic sectional view of an electronic device including a touch panel provided in a display panel in an in-cell form and a pressure sensor according to an embodiment. FIG. 7C is a schematic sectional view of an electronic device in which a touch panel and a pressure sensor are provided on a display panel in an in-cell form according to an embodiment.

Referring to FIGS. 7A to 7C, the pressure sensor 640 and the touch panel 620 may be formed in the same layer. According to an embodiment, the touch panel 620 may be placed on the display panel 630, and the pressure sensor 640 may be arranged between electrodes formed in the touch panel 620.

According to various embodiments, the pressure sensor 640 may be arranged on a lower layer of the display panel 630 formed with the touch panel 620 in an in-cell form. According to various embodiments, the pressure sensor 640 may be provided on the display panel 630 in the in-cell form together with the touch panel 620. According to an embodiment, electrodes may be formed on the thin film transistor substrate of the display panel 630, and the pressure sensor 640 may be arranged between the electrodes.

Figure 8A:
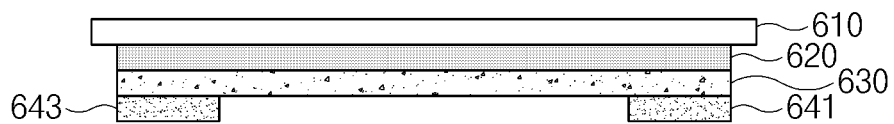
FIG. 8A is a schematic sectional view of an electronic device in which a pressure sensor is arranged in a partial area of a display module according to an embodiment.
Figure 8B:
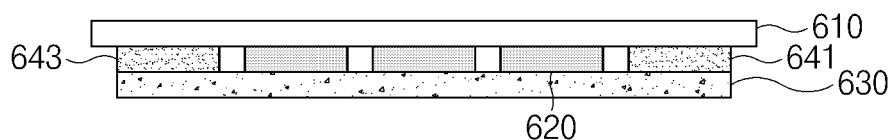
FIG. 8B is a schematic sectional view of an electronic device in which a pressure sensor, which is arranged in a partial area of a display module according to an embodiment, is formed in the same layer as a touch panel.
Figure 8C:
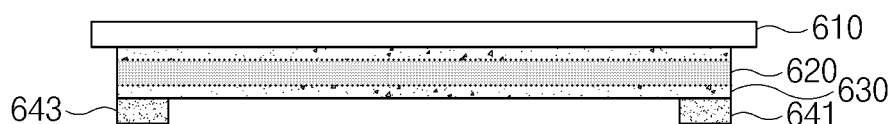
FIG. 8C is a schematic sectional view of an electronic device including a touch panel provided in an in-cell form on a display panel and a pressure sensor arranged in a partial area of a display module according to an embodiment.
Figure 8D:
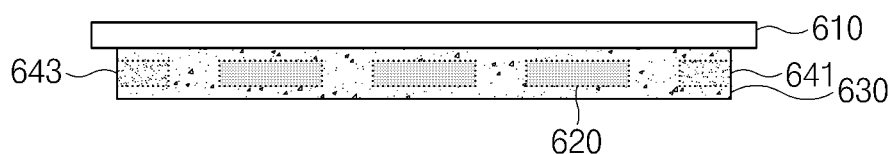
FIG. 8D is a schematic sectional view of an electronic device provided with a touch panel and a pressure sensor arranged in a partial area of a display module on the display panel in an in-cell form according to an embodiment.

FIG. 8A is a schematic sectional view of an electronic device in which a pressure sensor is arranged in a partial area of a display module according to an embodiment. FIG. 8B is a schematic sectional view of an electronic device in which a pressure sensor, which is arranged in a partial area of a display module according to an embodiment, is formed in the same layer as a touch panel. FIG. 8C is a schematic sectional view of an electronic device including a touch panel provided in an in-cell form on a display panel and a pressure sensor arranged in a partial area of a display module according to an embodiment. FIG. 8D is a schematic sectional view of an electronic device provided with a touch panel and a pressure sensor arranged in a partial area of a display module on the display panel in an in-cell form according to an embodiment.

Referring to FIGS. 8A to 8D, a pressure sensor (e.g., the pressure sensor 640) may be arranged in a partial area of a display module (e.g., the display module 110). According to an embodiment, a first pressure sensor 641 may be arranged in a specified area of a right side of the display module, and a second pressure sensor 643 may be arranged in a specified area of a left side of the display module.

According to various embodiments, the touch panel 620, the display panel 630, and the pressure sensor may be sequentially stacked on a lower layer of the front cover 610. According to an embodiment, the first pressure sensor 641 may arranged in the specified area of the right side of the display panel 630 and the second pressure sensor 643 may be arranged in the specified area of the left side of the display panel 630.

According to various embodiments, the pressure sensor and the touch panel 620 may be formed on the same layer. According to an embodiment, the touch panel 620 may be arranged on an upper layer of the display panel 630, and the first pressure sensor 641 may be arranged in an edge area of the right side of the touch panel 620. In addition, the second pressure sensor 643 may be arranged in an edge area of the left side of the touch panel 620.

According to various embodiments, the pressure sensor may be formed on a lower layer of the display panel 630 in which the touch panel 620 is formed in an in-cell form. According to an embodiment, the first pressure sensor 641 may be arranged in the specified area of the right side of the display panel 630 in which the touch panel 620 is formed in the in-cell form and the second pressure sensor 643 may be arranged in the specified area of the left side of the display panel 630 in which the touch panel 620 is formed in the in-cell form.

According to various embodiments, the pressure sensor may be provided in the in-cell form on the display panel 630 together with the touch panel 620. According to an embodiment, the touch panel 620 may be formed in the display panel 630, and the first pressure sensor 641 may be arranged in the edge area of the right side of the touch panel 620. In addition, the second pressure sensor 643 may be arranged in the edge area of the left side of the touch panel 620.

Figure 9A:
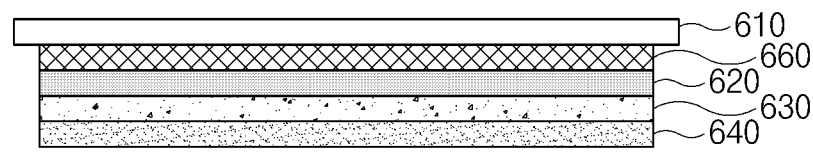
FIG. 9A is a schematic sectional view of an electronic device including an antenna arranged to be overlapped with a display area of a display module according to an embodiment.
Figure 9B:
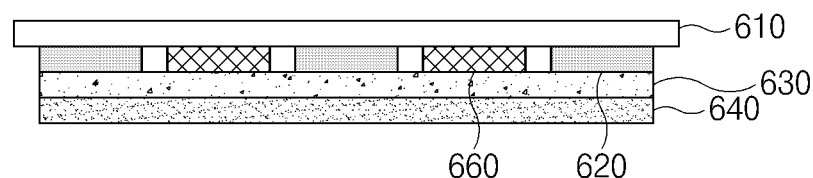
FIG. 9B is a schematic sectional view of an electronic device in which a touch panel and an antenna are formed in the same layer according to an embodiment.
Figure 9C:
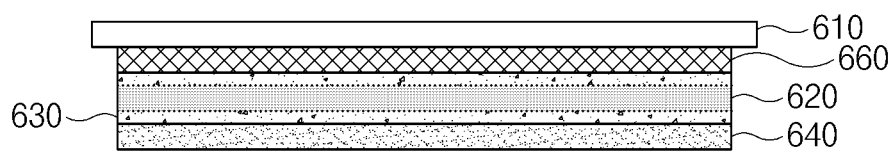
FIG. 9C is a schematic sectional view of an electronic device which includes an antenna arranged to be overlapped with a display area of a display module and a touch panel provided in a display panel in an in-cell form according to an embodiment.
Figure 9D:
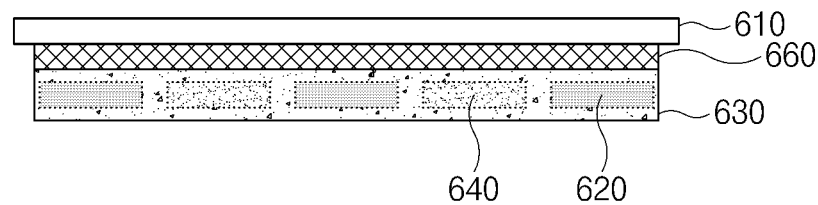
FIG. 9D is a schematic sectional view of an electronic device in which an antenna arranged to be overlapped with a display area of a display module and a touch panel and a pressure sensor are formed in the same layer in an in-cell form on a display panel according to an embodiment.
Figure 9E:
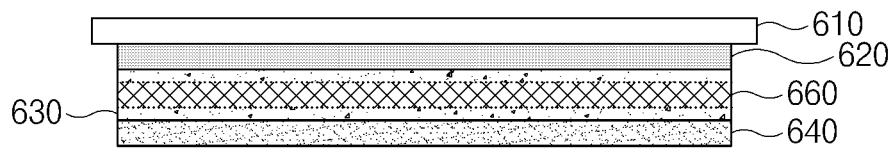
FIG. 9E is a schematic sectional view of an electronic device in which an antenna according to an embodiment is provided in an in-cell form on a display panel.
Figure 9F:
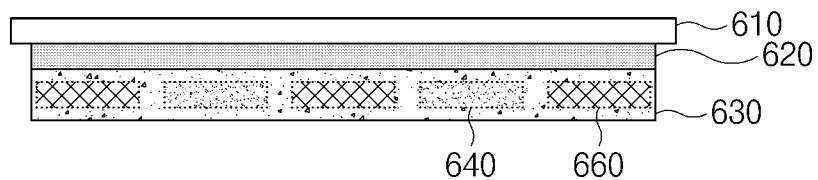
FIG. 9F is a schematic sectional view of an electronic device in which an antenna and a pressure sensor are formed in the same layer in an in-cell form on a display panel according to an embodiment.
Figure 9G:
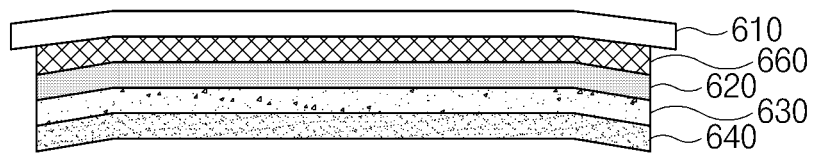
FIG. 9G is a schematic sectional view of an electronic device in which a portion of a display module is curved according to an embodiment.

FIG. 9A is a schematic sectional view of an electronic device including an antenna arranged to be overlapped with a display area of a display module according to an embodiment. FIG. 9B is a schematic sectional view of an electronic device in which a touch panel and an antenna are formed in the same layer according to an embodiment. FIG. 9C is a schematic sectional view of an electronic device which includes an antenna arranged to be overlapped with a display area of a display module and a touch panel provided in a display panel in an in-cell form according to an embodiment. FIG. 9D is a schematic sectional view of an electronic device in which an antenna arranged to be overlapped with a display area of a display module and a touch panel and a pressure sensor are formed in the same layer in an in-cell form on a display panel according to an embodiment. FIG. 9E is a schematic sectional view of an electronic device in which an antenna according to an embodiment is provided in an in-cell form on a display panel. FIG. 9F is a schematic sectional view of an electronic device in which an antenna and a pressure sensor are formed in the same layer in an in-cell form on a display panel according to an embodiment. FIG. 9G is a schematic sectional view of an electronic device in which a portion of a display module is curved according to an embodiment.

Referring to FIGS. 9A to 9G, an antenna 660 may be arranged to be overlapped with a display area of a display module (e.g., the display module 110). According to an embodiment, the antenna 660 may be arranged in a higher layer than the display panel 630. According to various embodiments, the antenna 660, the touch panel 620, the display panel 630, and the pressure sensor 640 may be sequentially stacked on the lower layer of the front cover 610.

According to various embodiments, the antenna 660 and the touch panel 620 may be formed on the same layer. According to an embodiment, the touch panel 620 may be placed on an upper layer of the display panel 630, and a radiator of the antenna 660 may be formed between electrodes formed on the touch panel 620.

According to various embodiments, the antenna 660 may be arranged on an upper layer of the display panel 630 in which the touch panel 620 is formed in an in-cell form. According to various embodiments, the antenna 660 may be arranged on an upper layer of the display panel 630 in which the touch panel 620 and the pressure sensor 640 are formed in an in-cell form.

According to various embodiments, the antenna 660 may be provided in an in-cell form on the display panel 630. According to an embodiment, the display panel 630, in which the antenna 660 is formed in an in-cell form, may be arranged on a lower layer of the touch panel 620 and the pressure sensor 640 may be arranged on a lower layer of the display panel 630.

According to various embodiments, the antenna 660 may be provided in an in-cell form on the display panel 630 together with the pressure sensor 640. According to an embodiment, the display panel 630, in which the antenna 660 and the pressure sensor 640 are formed in an in-cell form, may be arranged on a lower layer of the touch panel 620.

According to various embodiments, a portion of the display module may be formed to be curved. According to an embodiment, at least a portion of an edge area of the display module may be formed to be curved. When the portion of the display module is formed to be curved, the front cover 610, at least one of the front cover 610, or the antenna 660, the touch panel 620, the display panel 630 and the pressure sensor 640 which are sequentially stacked on the lower layer of the front cover 610, may form a curved surface at partial area.

Figure 10A:
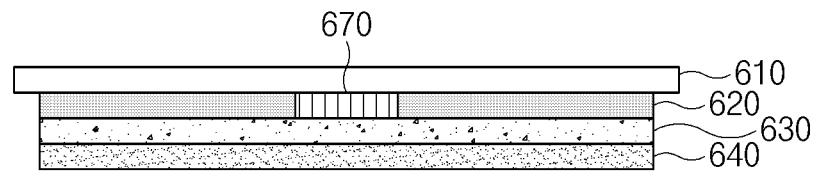
FIG. 10A is a schematic sectional view of an electronic device which includes a fingerprint recognition sensor arranged to be overlapped with a display area of a display module according to an embodiment.
Figure 10B:
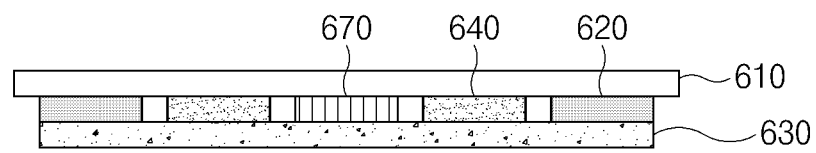
FIG. 10B is a schematic sectional view of an electronic device in which a fingerprint recognition sensor, a touch panel and a pressure sensor are formed on the same layer according to an embodiment.
Figure 10C:
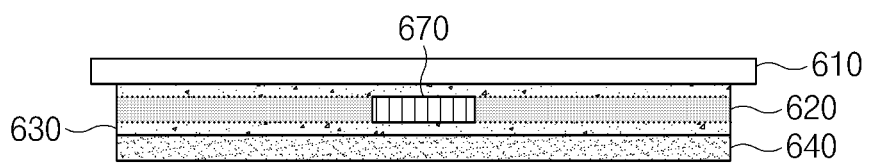
FIG. 10C is a schematic sectional view of an electronic device in which a fingerprint recognition sensor is provided in an in-cell form on a display panel together with a touch panel according to an embodiment.
Figure 10D:
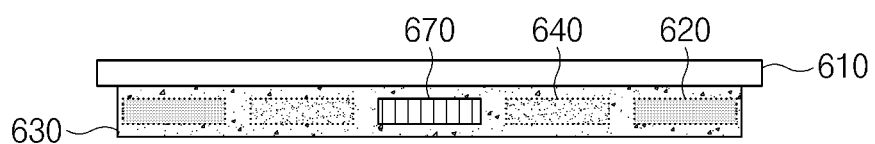
FIG. 10D is a schematic sectional view of an electronic device in which a fingerprint sensor, a touch panel and a pressure sensor are formed in an in-cell form on the same layer on the display panel according to an embodiment.

FIG. 10A is a schematic sectional view of an electronic device which includes a fingerprint recognition sensor arranged to be overlapped with a display area of a display module according to an embodiment. FIG. 10B is a schematic sectional view of an electronic device in which a fingerprint recognition sensor, a touch panel and a pressure sensor are formed on the same layer according to an embodiment. FIG. 10C is a schematic sectional view of an electronic device in which a fingerprint recognition sensor is provided in an in-cell form on a display panel together with a touch panel according to an embodiment. FIG. 10D is a schematic sectional view of an electronic device in which a fingerprint sensor, a touch panel and a pressure sensor are formed in an in-cell form on the same layer on the display panel according to an embodiment.

Referring to FIGS. 10A to 10D, an electronic device (e.g., the electronic device 100) may further include a fingerprint recognition sensor 670. According to various embodiments, the fingerprint recognition sensor 670 and the touch panel 620 may be arranged on the same layer. According to an embodiment, the touch panel 620 may be arranged on a lower layer of the front cover 610 and the fingerprint recognition sensor 670 may be arranged in a specified area (e.g., a lower end central area) of the touch panel 620. In addition, the display panel 630 and the pressure sensor 640 may be stacked on a lower layer of the touch panel 620.

According to various embodiments, the fingerprint recognition sensor 670 may be formed on the same layer as the touch panel 620 and the pressure sensor 640. In this case, the touch panel 620, the pressure sensor 640, and the fingerprint recognition sensor 670 may be placed on an upper surface of the display panel 630.

According to various embodiments, the fingerprint recognition sensor 670 may be provided in an in-cell form on the display panel 630 together with the touch panel 620. According to an embodiment, the touch panel 620 may be provided in an in-cell form on the display panel 630 and the fingerprint recognition sensor 670 may be arranged in a specific area of the touch panel 620.

According to various embodiments, the fingerprint recognition sensor 670 may be provided in an in-cell form on the display panel 630 together with the touch panel 620 and the pressure sensor 640.

Figure 11A:
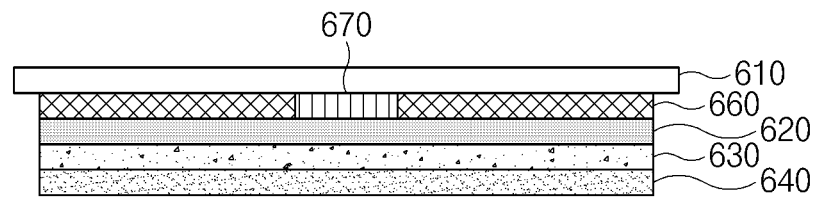
FIG. 11A is a schematic sectional view of an electronic device in which a fingerprint recognition sensor and an antenna is formed in the same layer according to an embodiment.
Figure 11B:
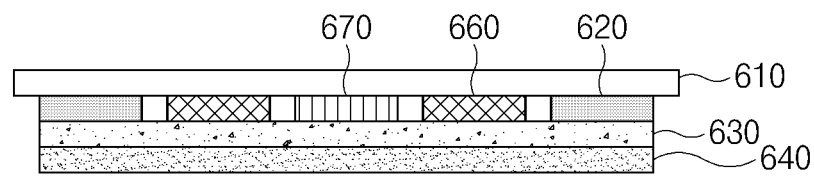
FIG. 11B is a schematic sectional view of an electronic device in which a fingerprint recognition sensor, an antenna and a touch panel are formed on the same layer according to an embodiment.
Figure 11C:
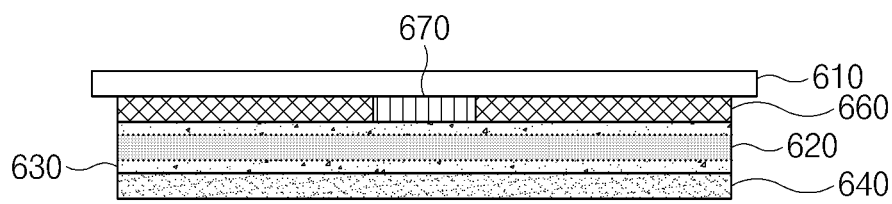
FIG. 11C is a schematic sectional view of an electronic device in which a fingerprint recognition sensor and an antenna are formed on the same layer and a touch panel is provided in an in-cell form on a display panel according to an embodiment.
Figure 11D:
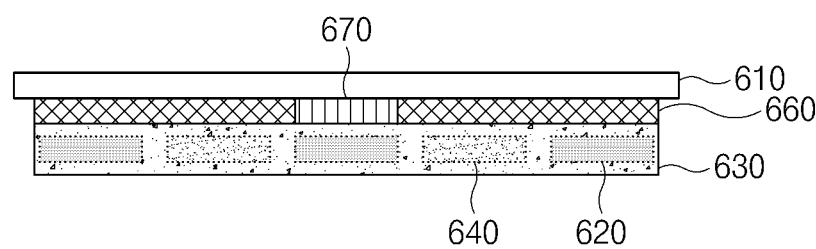
FIG. 11D is a schematic sectional view of an electronic device in which a fingerprint recognition sensor and an antenna are formed on the same layer and a touch panel and a pressure sensor are formed on the same layer in an in-cell form on the display panel.

FIG. 11A is a schematic sectional view of an electronic device in which a fingerprint recognition sensor and an antenna is formed on the same layer according to an embodiment. FIG. 11B is a schematic sectional view of an electronic device in which a fingerprint recognition sensor, an antenna and a touch panel are formed on the same layer according to an embodiment. FIG. 11C is a schematic sectional view of an electronic device in which a fingerprint recognition sensor and an antenna are formed on the same layer and a touch panel is provided in an in-cell form on a display panel according to an embodiment. FIG. 11D is a schematic sectional view of an electronic device in which a fingerprint recognition sensor and an antenna are formed on the same layer and a touch panel and a pressure sensor are formed on the same layer in an in-cell form on the display panel.

Referring to FIGS. 11A to 11D, the fingerprint recognition sensor 670 may be provided on the same layer as the antenna 660. According to various embodiments, the fingerprint recognition sensor 670 may be formed in a specific area (e.g., a lower end central area) of the antenna 660. According to an embodiment, the antenna 660 and the fingerprint recognition sensor 670 may be arranged on a lower layer of the front cover 610, and the touch panel 620, the display panel 630, and the pressure sensor 640 may be sequentially stacked on a lower layer of the antenna 660.

According to various embodiments, the touch panel 620, the antenna 660, and the fingerprint recognition sensor 670 may be formed on the same layer. According to an embodiment, the touch panel 620, the antenna 660, and the fingerprint recognition sensor 670 may be arranged on an upper layer of the display panel 630.

According to various embodiments, the display panel 630, in which the touch panel 620 is formed in an in-cell form, may be arranged on a lower layer of the antenna 660 that is arranged on the same layer as the fingerprint recognition sensor 670. In addition, the pressure sensor 640 may be arranged on a lower layer of the display panel 630 on which the touch panel 620 is formed in an in-cell form.

According to various embodiments, the display panel 630 in which the touch panel 620 and the pressure sensor 640 are formed in an in-cell form may be formed on a lower layer of the antenna 660 that is arranged on the same layer as the fingerprint recognition sensor 670.

Figure 12A:
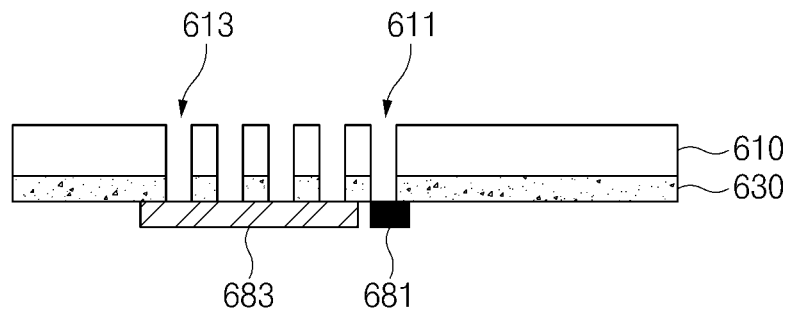
FIG. 12A is a schematic sectional view of an electronic device including a speaker and a microphone according to an embodiment.
Figure 12B:
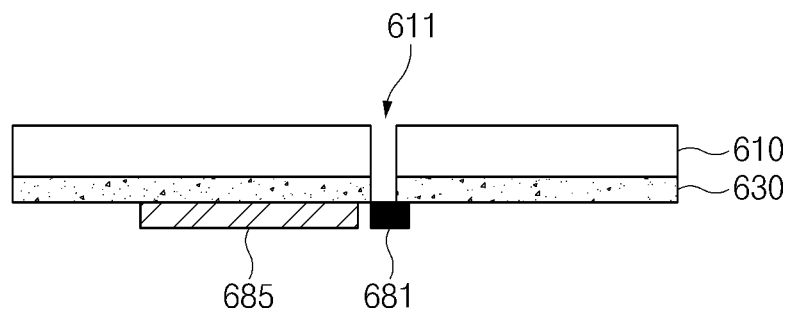
FIG. 12B is a schematic sectional view of an electronic device including a piezoelectric element and a microphone according to an embodiment.
Figure 12C:
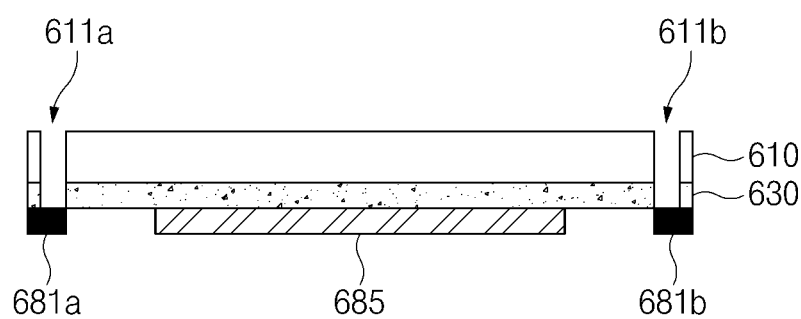
FIG. 12C is a schematic sectional view of an electronic device including a piezoelectric element and a microphone arranged in a partial area of a display module according to an embodiment.
Figure 12D:
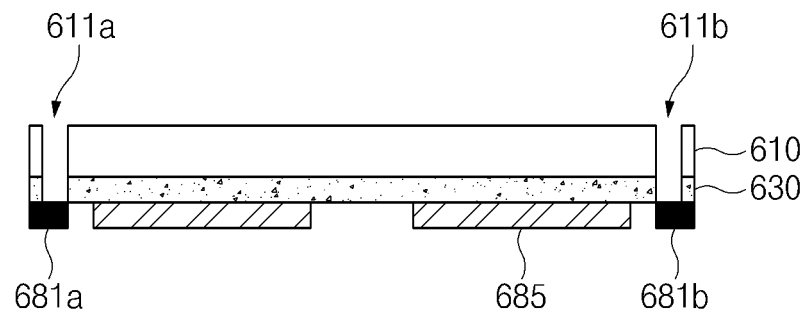
FIG. 12D is a schematic sectional view of an electronic device including a plurality of piezoelectric elements and a microphone arranged in a partial area of a display module according to an embodiment.
Figure 12E:
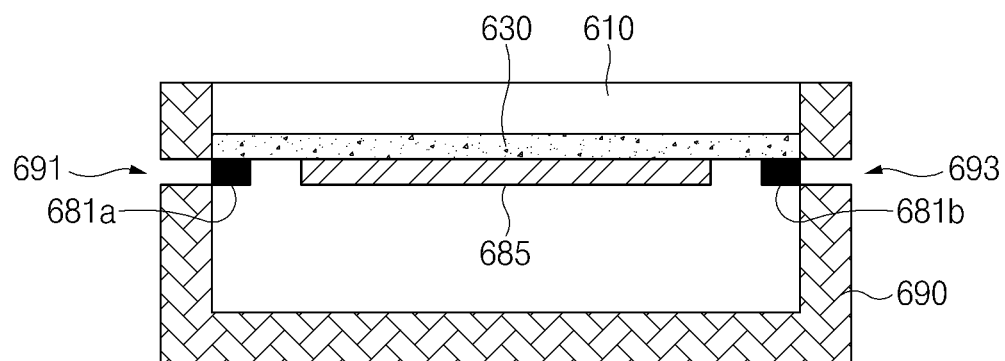
FIG. 12E is a schematic sectional view of an electronic device in which a microphone hole is formed on a side surface of a housing according to an embodiment.

FIG. 12A is a schematic sectional view of an electronic device including a speaker and a microphone according to an embodiment. FIG. 12B is a schematic sectional view of an electronic device including a piezoelectric element and a microphone according to an embodiment. FIG. 12C is a schematic sectional view of an electronic device including a piezoelectric element and a microphone arranged in a partial area of a display module according to an embodiment. FIG. 12D is a schematic sectional view of an electronic device including a plurality of piezoelectric elements and a microphone arranged in a partial area of a display module according to an embodiment. FIG. 12E is a schematic sectional view of an electronic device in which a microphone hole is formed on a side surface of a housing according to an embodiment.

Referring to FIGS. 12A to 12E, an electronic device (e.g., the electronic device 100) may include a microphone 681 and a speaker (e.g., a receiver) 683. According to an embodiment, the display panel 630 may be arranged on a lower layer of the front cover 610, and the microphone 681 and the speaker 683 may be arranged on a lower layer of the display panel 630. According to various embodiments, the front cover 610 and the display panel 630 are provided with at least one through-hole (e.g., a microphone hole 611 and a speaker hole 613) to allow sound to flow in and out of the microphone 681 and the speaker 683. According to one embodiment, the microphone 681 and the speaker 683 may be arranged in a non-display area (e.g., a black matrix (BM) area) of a display module (e.g., the display module 110). According to an embodiment, the through-hole formed in the front cover 610 and the display panel 630 may have a diameter in the range of 1 mm to 10 mm.

According to various embodiments, an electronic device may include a piezoelectric element 685 (e.g., a piezo sensor). According to an embodiment, the display panel 630 may be arranged on a lower layer of the front cover 610, and the microphone 681 and the piezoelectric element 685 may be arranged on a lower layer of the display panel 630. According to various embodiments, the front cover 610 and the display panel 630 are provided with the microphone hole 611 in an area overlapped with an area in which the microphone 681 is arranged such that sound is introduced into the microphone 681.

According to various embodiments, an electronic device may include the plurality of microphones 681. According to an embodiment, the display panel 630 may be arranged on a lower layer of the front cover 610, and first and second microphones 681a and 681b and the piezo sensor 685 may be arranged on a lower layer of the display panel 630. According to an embodiment, the piezo sensor 685 may be arranged in a central area of the display panel 630, and the first and second microphones 681a and 681b may be arranged on both side edges of the display panel 630, respectively. In addition, the front cover 610 and the display panel 630 may be provided with first and second microphone holes 611a and 611b to allow sound to be introduced into the first and second microphones 681a and 681b. According to various embodiments, an electronic device may include the plurality of piezo sensors 685.

According to various embodiments, the microphone holes, which are provided to introduce sound into the first and second microphone 681a and 681b, may be formed in a housing 690 of the electronic device. According to an embodiment, the display panel 630 may be arranged on a lower layer of the front cover 610, and the first and second microphones 681a and 681b and the piezo sensor 685 may be arranged on a lower layer of the display panel 630. According to an embodiment, the piezo sensor 685 may be arranged in the central area of the display panel 630, and the first and second microphones 681a and 681b may be arranged on both side edge areas of the display panel 630 while being adjacent to the housing 690 of the electronic device. In this case, first and second microphone holes 691 and 693 may be provided in a specific area of the housing 690 instead of forming the microphone holes in the front cover 610 and the display panel 630.

Figure 13:
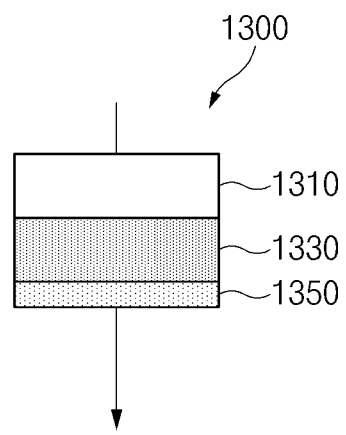
FIG. 13 is a schematic sectional view of a piezo sensor according to an embodiment.

FIG. 13 is a schematic sectional view of a piezo sensor according to an embodiment.

Referring to FIG. 13, a piezo sensor 1300 may include a first conductive member 1310, a piezoelectric element 1330, and a second conductive member 1350. According to an embodiment, in the piezo sensor 1300, the piezoelectric element 1330 may be interposed between the first and second conductive members 1310 and 1350. According to various embodiments, the piezo sensor 1300 may detect external pressure or generate a mechanical vibration according to an input voltage by using the property of the piezoelectric element 1330 capable of converting a voltage into a mechanical input or a mechanical input into a voltage. For example, when a display module (e.g., the display module 110) occupies almost the entire front surface of an electronic device (e.g., the electronic device 100), it is difficult to arrange, on the front surface of the electronic device, a receiver that outputs sound to an outside. In this case, instead of mounting the receiver on the front surface of the electronic device, some components (e.g., a display module) of the electronic device may be utilized as the function of a transducer. For example, the piezo sensor 1300 may be used to vibrate the display module to transfer a transmitting/receiving voice signal. According to an embodiment, the piezo sensor 1300 may be placed on a back or side surface of the display module. In addition, the piezo sensor 1300 may be attached to the display module directly to cause vibration, or may be arranged while being spaced apart from the display module by a specified distance, thereby indirectly transferring vibration to the display module.

Figure 14A:
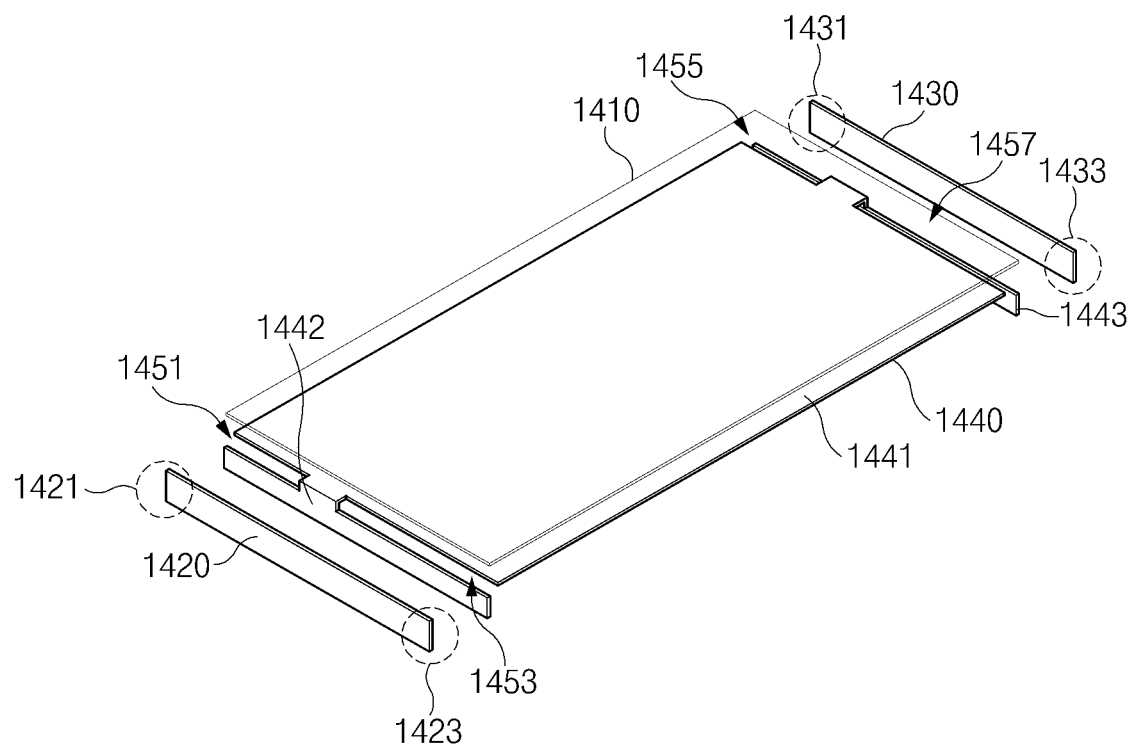
FIG. 14A is an exploded perspective view of a portion of an electronic device including a sub-display module according to an embodiment.
Figure 14B:
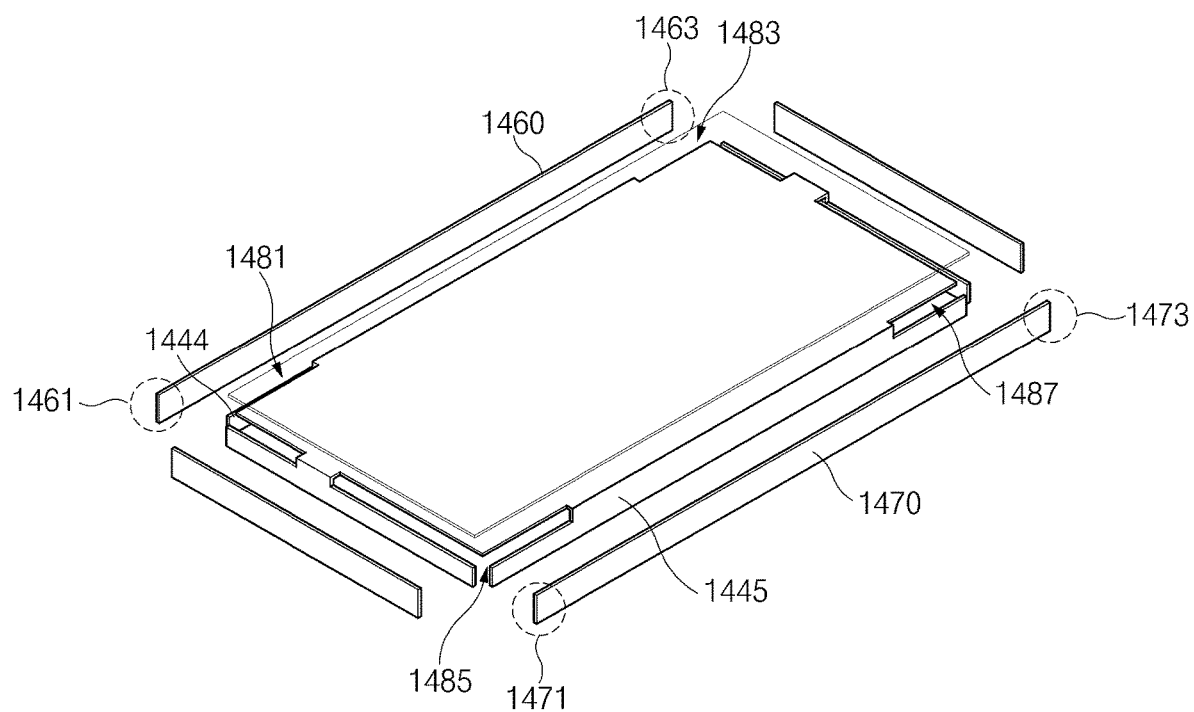
FIG. 14B is an exploded perspective view of a portion of an electronic device of another type including a sub-display module according to an embodiment.

FIG. 14A is an exploded perspective view of a portion of an electronic device including a sub-display module according to an embodiment. FIG. 14B is an exploded perspective view of a portion of an electronic device of another type including a sub-display module according to an embodiment.

Referring to FIGS. 14A and 14B, an electronic device (e.g., the electronic device 100) may have an antenna configuration that is changed depending on the type of a display module. According to various embodiments, the electronic device may include a main display module 1410, first and second sub-display modules 1420 and 1430, and a ground member 1440. The main display module 1410 may be arranged on a front surface of the electronic device. The first sub-display module 1420 may be arranged on a lower side surface of the electronic device, and the second sub-display module 1430 may be arranged on an upper side surface of the electronic device.

According to various embodiments, the first or second sub-display module 1420 or 1430 may utilize a conductive member, which is provided therein, as an antenna radiator. According to an embodiment, a first antenna radiator may be formed in a left area 1421 of the first sub-display module 1420 and a second antenna radiator may be formed in a right area 1423. In addition, a third antenna radiator may be formed in a left area 1431 of the second sub-display module 1430 and a fourth antenna radiator may be formed in the right area 1433. According to various embodiments, the conductive member of the first or second sub-display module 1420 or 1430 utilized as the antenna radiator may be electrically connected to a conductive member of the main display module 1410.

According to various embodiments, an antenna may be formed by utilizing a non-conductive area provided between the main display module 1410 and the first sub-display module 1420 or between the main display module 1410 and the second sub-display module 1430. According to an embodiment, the non-conductive area may include a slot area formed between a front portion 1441 and a lower side portion 1442 of the ground member 1440 or between the front portion 1441 and an upper side portion 1443. In the drawing, first and second slot areas 1451 and 1453 may be provided in a specific area where the front portion 1441 and the lower side portion 1442 of the ground member 1440 are connected to each other, and third and fourth slot areas 1455 and 1457 may be provided in a specific area where the front portion 1441 and the upper side portion 1443 of the ground member 1440 are connected to each other. According to various embodiments, a feeder may be formed in the slot area and an RF signal may be applied to the antenna radiator, such that they are operated as individual antenna radiators. According to an embodiment, the signal line and the ground line connected to an RF communication circuit may be connected to the conductive member of the first sub-display module 1420 (or the second sub-display module 1430) and a specific point of the ground member 1440, which are utilized as antenna radiators, respectively, to form the feeder.

According to various embodiments, the display module may be arranged on the left and right side surfaces as well as the upper and lower side surfaces of the electronic device. According to an embodiment, the electronic device may be provided on the left side surface with a third sub-display module 1460 and on the right side surface with a fourth sub-display module 1470. In this case, the ground member 1440 may be also formed with left and right side portions 1444 and 1445, each of which is provided with a slot area. According to an embodiment, fifth and sixth slot areas 1481 and 1483 may be provided on the left side portion 1444 of the ground member 1440, and seventh and eighth slot areas 1485 and 1487 may be provided on the right side portion 1445.

According to various embodiments, the antenna may be formed by utilizing the third and fourth sub-display modules 1460 and 1470 arranged on the left and right side surfaces of the electronic device. According to an embodiment, the conductive member provided inside the third or fourth sub-display module 1460 or 1470 may be utilized as an antenna radiator. As illustrated in the drawings, a fifth antenna radiator may be formed in a left area 1461 of the third sub-display module 1460, and a sixth antenna radiator may be formed in a right area 1463. In addition, a seventh antenna radiator may be formed in a left area 1471 of the fourth sub-display module 1470, and an eighth antenna radiator may be formed in a right area 1473.

Figure 15:
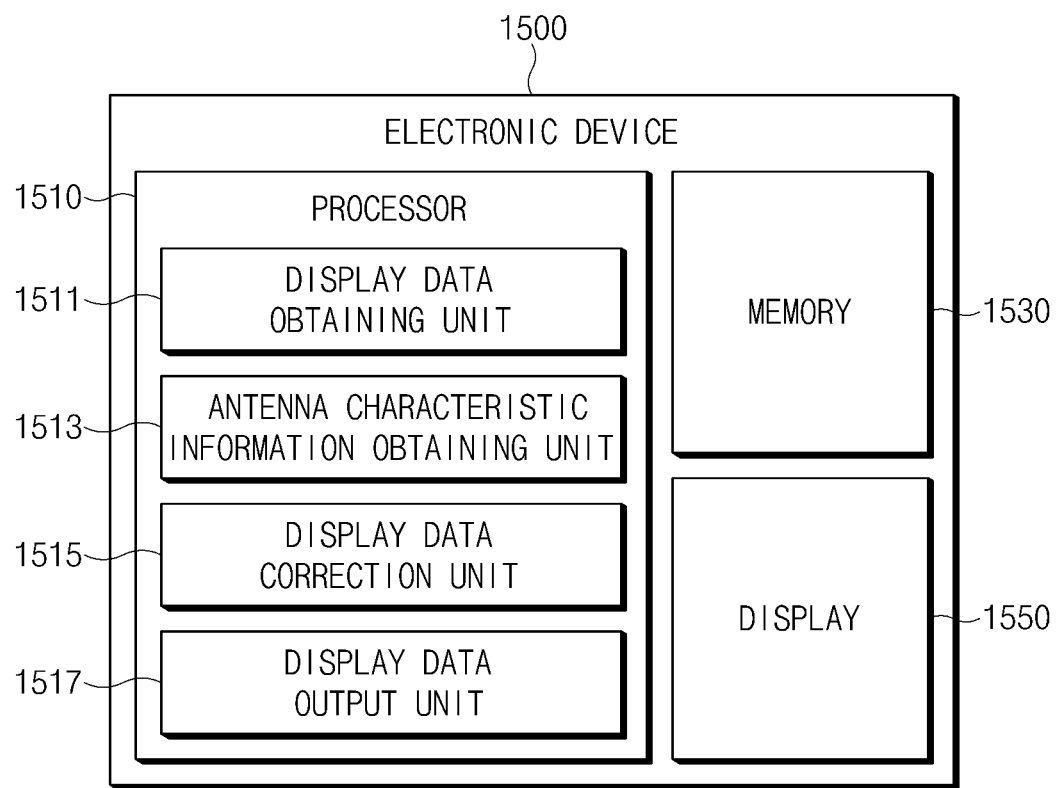
FIG. 15 is a schematic block diagram of an electronic device according to an embodiment.

FIG. 15 is a schematic block diagram of an electronic device according to an embodiment.

Referring to FIG. 15, an electronic device 1500 may include a processor 1510, a memory 1530, and a display 1550. The processor 1510 may perform operations or data processing relating to control and/or communication of at least one other component of the electronic device 1500. According to various embodiments, when outputting an image onto the display 1550, the processor 1510 may correct and output display data based on characteristic information of an antenna. In an embodiment, the processor 1510 may control the output of the display data based on characteristics of the display data to be output to the display 1550. For example, the processor 1510 may not output the display data to an area overlapped with an antenna mounting area when the display data correspond to a specified kind of contents (e.g., a text, a moving picture, and the like). The characteristic information of the antenna may include, for example, a location of the antenna on a display area of the display 1550, a type of the antenna (e.g., the pattern of an antenna radiator), a color of the antenna, transparency of the antenna, reflectivity of the antenna, or the like.

The processor 1510 may include a display data obtaining unit 1511, an antenna characteristic information obtaining unit 1513, a display data correction unit 1515, and a display data output unit 1517. The display data obtaining unit 1511 may obtain display data related to an execution screen according to the execution of the application stored in the memory 1530. The display data obtaining unit 1511 may obtain information about the positions of display objects to be output to the display 1550 or graphic characteristics (e.g., color, saturation, brightness (or luminance), transparency, and the like). According to various embodiments, the display data obtaining unit 1511 may obtain the display data from an external device. For example, the display data may be obtained from an external device wire/wireless-connected to the electronic device 1500.

The antenna characteristic information obtaining unit 1513 may obtain the characteristic information of the antenna that is arranged while being overlapped with the display area of the display 1550. According to an embodiment, the antenna characteristic information obtaining unit 1513 may obtain the location of the antenna on the display area of the display 1550, the type of the antenna, the color of the antenna, the transparency of the antenna, the reflectivity of the antenna, and the like. According to various embodiments, the antenna characteristic information obtaining unit 1513 may obtain the characteristic information of an antenna previously stored in the memory 1530. In an embodiment, the antenna characteristic information obtaining unit 1513 may obtain the characteristic information of the antenna in real time. For example, when the antenna, which is arranged while being overlapped with the display area of the display 1550, is fluidly changed in length, area, thickness, and the like (e.g., a liquid antenna), the antenna characteristic information obtaining unit 1513 may obtain the characteristic information of the antenna in real time.

According to various embodiments, the characteristic information of the antenna may be implemented as a database, and the database may be stored in the memory 1530 of the electronic device 1500. In an embodiment, the database may be stored in a memory of the external electronic device. In this case, the antenna characteristic information obtaining unit 1513 may be connected to a network through wire/wireless communication to obtain the antenna characteristic information from the external electronic device.

The display data correction unit 1515 may correct the display data based on the obtained characteristic information of the antenna. According to an embodiment, the display data correction unit 1515 may correct the display data which have a display location corresponding to the position of the antenna on the display area of the display 1550, depending on the type, color, transparency, or reflectivity of the antenna. According to various embodiments, the display data correction unit 1515 may support to allow the display data to be displayed in the original graphic characteristics (e.g., color, saturation, brightness (or luminance), and the like). For example, when the color of the display data to be output is 'RGB1' and the color of the antenna is 'RGB2', the display data correction unit 1515 may change the color of the display data into 'RGB3'. In this case, the 'RGB3' may exhibit the same or similar color as the 'RGB1' by color interpolation with the 'RGB2'. However, the method of correcting the display data is not limited thereto. According to various embodiments, the display data correction unit 1515 may correct the display data by adjusting the transparency as well as the color of the display data. The display data output unit 1517 may output the corrected display data to the display 1550. In an embodiment, the display data output unit 1517 may not output the display data having the display location corresponding to the location of the antenna.

The memory 1530 may store instructions or data related to at least one other component of the electronic device 1500. According to various embodiments, the memory 1530 may store an application supported by the electronic device 1500. The application may include a preload application or a third party application downloadable from an external electronic device. According to various embodiments, the memory 1530 may store the characteristic information of the antenna. According to an embodiment, the memory 1530 may store the location, type, color, transparency, reflectivity, and the like, of the antenna on the display area of the display 1550.

The display 1550 may display various kinds of contents (e.g., a text, an image, a video, an icon, a symbol, and the like) (or display data) for a user. According to various embodiments, the display 1550 may include a touch screen and may receive a touch, gesture, proximity, or hovering input by using, for example, an electronic pen or a part of the user body.

As described above, according to various embodiments, an electronic device (e.g., the electronic device 1500) may include a display (e.g., the display 1550) for outputting display data, an antenna arranged on a display area of the display, at least one processor (e.g., the processor 1510) electrically connected to the display, and a memory (e.g., the memory 1530) electrically connected to the processor, where the memory may store instructions that, when executed, cause the processor to correct the display data based on the characteristic information of the antenna when the display location of the display data is overlapped with the arranged location of the antenna.

According to various embodiments, the characteristic information of the antenna may include at least one of the location of the antenna on the display area of the display, the type of the antenna, the color of the antenna, the transparency of the antenna, or the reflectivity of the antenna.

According to various embodiments, when executed, the instructions may cause the processor to correct the display data through color interpolation based on the color of the antenna.

According to various embodiments, when executed, the instructions may cause the processor to correct the display data included in the area overlapped with the arranged location of the antenna in the display area of the display and the area adjacent to the overlapped area.

According to various embodiments, when executed, the instructions may cause the processor to correct the color of the display data included in the adjacent area based on the color of the display data included in the overlapped area.

According to various embodiments, when executed, the instructions may cause the processor to apply a gradient effect to the display data included in the overlapped area and the display data included in the adjacent area.

According to various embodiments, the memory may store the characteristic information of the antenna.

According to various embodiments, the electronic device may further include a communication interface for communication with an external device, and when executed, the instructions may cause the processor to obtain the display data from the external device.

According to various embodiments, the antenna may include a liquid antenna in which at least one of a length, an area, or a thickness is fluidly changed.

According to various embodiments, when executed, the instructions may cause the processor to obtain the characteristic information of the liquid antenna in real time.

According to various embodiments, an electronic device may include a housing including a first surface facing a first direction and a second surface facing a second direction opposite to the first direction, a display including a screen exposed through at least a portion of the first surface, an antenna that is overlapped with a first area that is part of the screen, exposed to the first surface, and includes at least a translucent and/or substantially transparent material, a communication circuit located in the housing and electrically connected to the antenna, at least one processor located in the housing and electrically connected to the display and the communication circuit, and a memory electrically connected to the processor, where the memory stores instructions that, when executed, cause the processor to determine a first partial data to be displayed in a first area, among display data to be displayed on the screen, determine a second partial data to be displayed in a second area adjacent to the first area, among the display data to be displayed on the screen, and change at least one of the first partial data or the second partial data.

According to various embodiments, when executed, the instructions may cause the processor to change at least one of the first partial data or the second partial data such that at least one of graphic properties of the first partial data is substantially the same as at least one of graphic properties of the second partial data.

According to various embodiments, when executed, the instructions may cause the processor to change at least one of a saturation, a brightness, a luminance, a pattern, a color, a text, an image, or a symbol of the second partial data and display the changed at least one on the second area.

According to various embodiments, when executed, the instructions may cause the processor to change at least one of a saturation, a brightness, a luminance, a pattern, a color, a text, an image, or a symbol of the first partial data and display the changed at least one on the first area.

According to various embodiments, when executed, the instructions may cause the processor to change at least one of saturations, brightness, luminance, patterns, colors, texts, images, or symbols of the first and second partial data and display the changed at least one on the first and second areas, respectively.

According to various embodiments, the at least one processor may include at least one of an application processor or a graphic processing unit.

According to various embodiments, the screen may occupy from about 90% to about 100% of the first surface.

Figure 16:
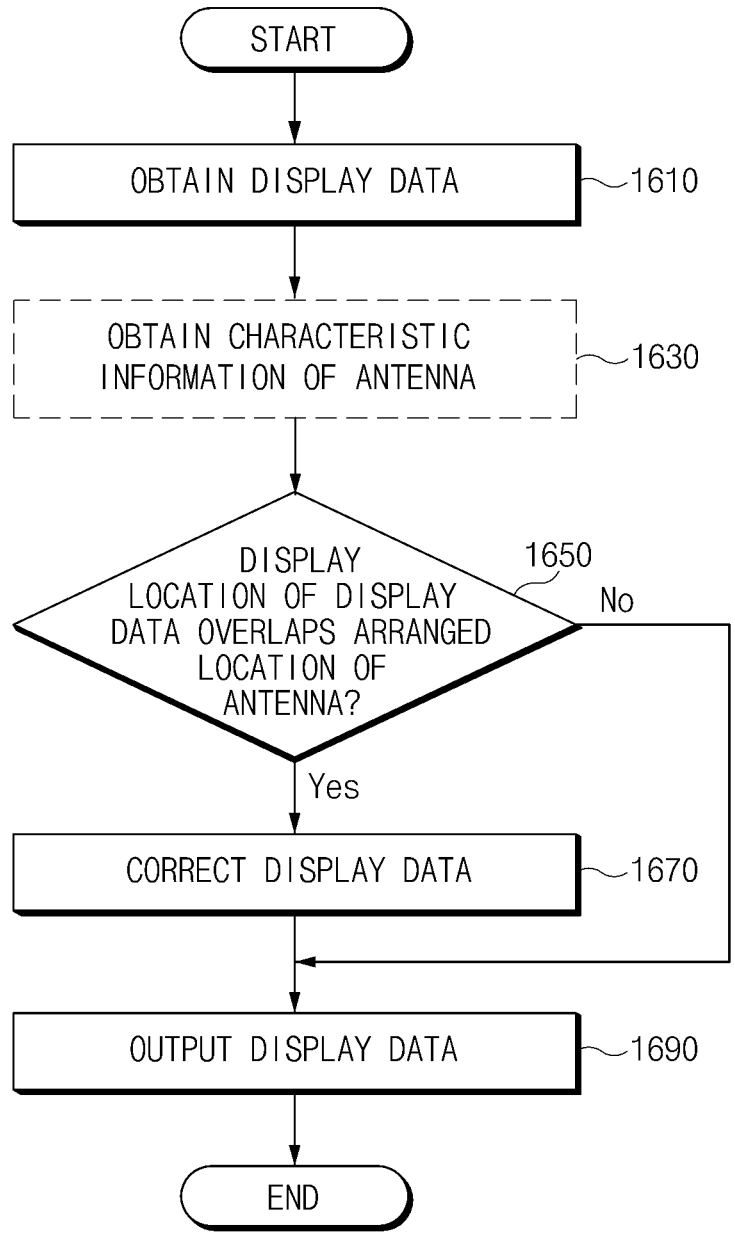
FIG. 16 is a flowchart illustrating an operation method of an electronic device related to a screen display according to an embodiment.

FIG. 16 is a flowchart illustrating an operation method of an electronic device related to a screen display according to an embodiment.

Referring to FIG. 16, in operation 1610, an electronic device (e.g., the electronic device 100) may obtain display data. According to an embodiment, the electronic device may obtain information about locations or graphical characteristics (e.g., a color, a saturation, a brightness (or luminance), a transparency, and the like) of display objects to be output to the display. As another example, the electronic device may determine kinds of the display objects. For example, the electronic device may determine whether the display objects correspond to a specified kind of contents (e.g., a text, a video, and the like).

In operation 1630, the electronic device may obtain the characteristic information of the antenna. According to various embodiments, the electronic device may obtain information about a location, a type, a color, a transparency, a reflectivity, and the like of the antenna arranged on the display area of the display. According to an embodiment, the electronic device may obtain the characteristic information of the antenna from the memory. According to various embodiments, the electronic device may omit performing operation 1630. In this case, the electronic device may utilize the characteristic information of an antenna specified in advance. For example, when the characteristic information of the antenna arranged on the display area of the display is not fluidly changed, the electronic device may set the characteristic information of the antenna in advance.

In operation 1650, the electronic device may determine whether the display location of the obtained display data is overlapped with the arranged location of the antenna. According to various embodiments, when the display location of the display data is not overlapped with the arranged location of the antenna, in operation 1690, the electronic device may output the obtained display data.

According to various embodiments, when the display location of the display data is overlapped with the location of the antenna, in operation 1670, the electronic device may correct the display data based on the characteristic information of the antenna. In addition, in operation 1690, the electronic device may output the corrected display data. In an embodiment, when the display location of the display data is overlapped with the arranged location of the antenna, the electronic device may not output the display data to the overlapped area.

As described above, according to various embodiments, a screen display method of an electronic device may include an operation of obtaining the display data to be output to the display, an operation of obtaining the characteristic information of the antenna arranged on the display area of the display, an operation of correcting the display data based on the characteristic information of the antenna when the display location of the display data is overlapped with the arranged location of the antenna, and an operation of outputting the display data.

According to various embodiments, the operation of obtaining the display data may include an operation of obtaining the display data from an external device wire/wireless-connected to the electronic device.

According to various embodiments, the operation of obtaining the characteristic information of the antenna may include an operation of obtaining the characteristic information of the antenna stored in the memory of the electronic device.

According to various embodiments, the operation of obtaining the characteristic information of the antenna may include an operation of obtaining at least one of the location of the antenna on the display area of the display, the type of the antenna, the color of the antenna, the transparency of the antenna, or the reflectivity of the antenna.

According to various embodiments, the operation of correcting the display data based on the characteristic information of the antenna may include an operation of correcting the display data through color interpolation based on the color of the antenna.

According to various embodiments, the operation of correcting the display data based on the characteristic information of the antenna may include an operation of correcting the display data included in the area overlapped with the arranged location of the antenna and the area adjacent to the overlapped area in the display area of the display.

According to various embodiments, the operation of correcting the display data included in the adjacent area may include an operation of correcting the color of the display data included in the adjacent area based on the color of the display data included in the overlapped area.

According to various embodiments, the operation of correcting the color of the display data included in the adjacent area may include an operation of applying a gradient effect to the display data included in the overlapped area and the display data included in the adjacent area.

According to various embodiments, the operation of obtaining the characteristic information of the antenna may include an operation of obtaining the characteristic information of the antenna in real time when at least one of the length, the area or the thickness of the antenna may be fluidly changed.

Figure 17A:
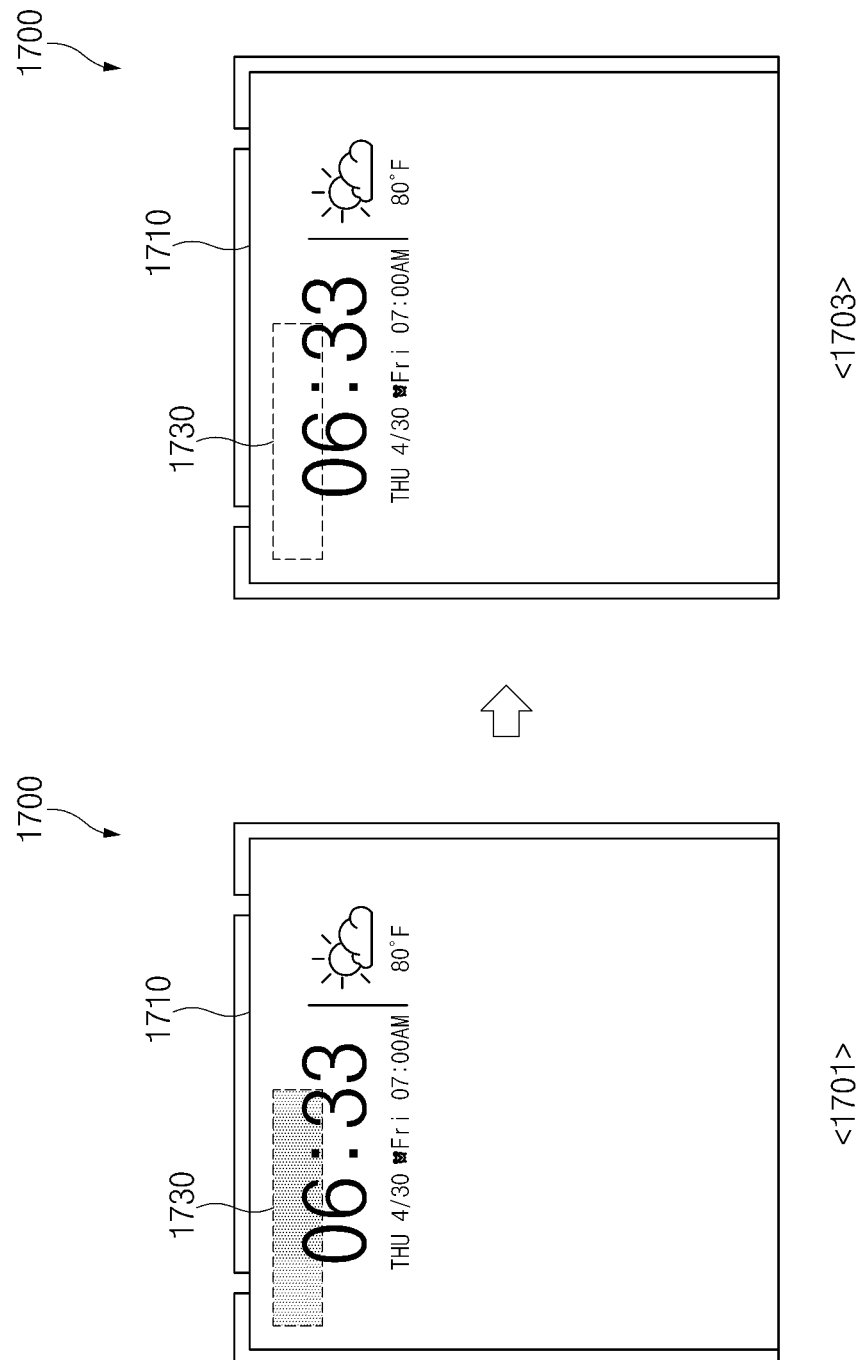
FIG. 17A is a view for explaining a screen display in a display area overlapped with an antenna according to an embodiment.
Figure 17B:
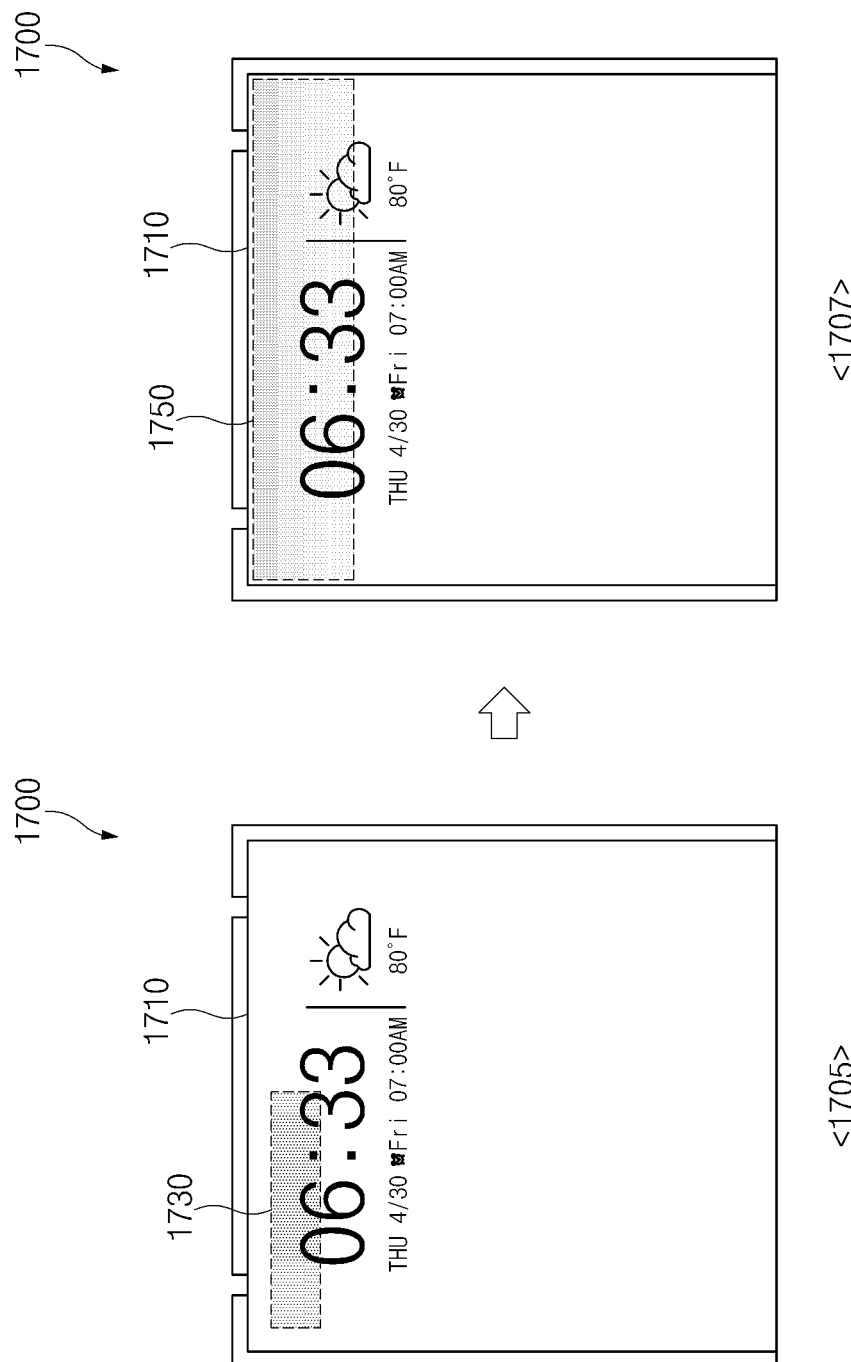
FIG. 17B is a view for explaining a screen display in a display area overlapped with an antenna and an area adjacent to the antenna according to an embodiment.

FIG. 17A is a view for explaining a screen display in a display area overlapped with an antenna according to an embodiment. FIG. 17B is a view for explaining a screen display in a display area overlapped with an antenna and an area adjacent to the antenna according to an embodiment.

Referring to FIGS. 17A and 17B, in a case where the display location of display data is overlapped with the position of the antenna when a screen is output to a display 1710, an electronic device 1700 may correct and output the display data.

According to various embodiments, the electronic device 1700 may correct the display data based on the characteristic information of an antenna in an area 1730 overlapping with an arranged location of the antenna in the display area of the display. For example, as in a first state 1701, the electronic device 1700 may output the display data as it is, to an area except for the overlapped area 1730. In addition, the electronic device 1700 may correct the display data based on the type, color, transparency, or reflectivity of the antenna in the overlapped area 1730, and may support to display the display data corresponding to the original graphic property as in a second state 1703. For example, the electronic device 1700 may correct and output the display data by a method such as color interpolation using the color of the antenna.

According to various embodiments, the electronic device 1700 may correct and output the display data in an area 1750 including the overlapped area 1730 and adjacent to the overlapped area 1730 as well as the overlapped area 1730. According to an embodiment, as in a third state 1705, even when the display data are corrected in the overlapped area 1730, the electronic device 1700 may not fully represent the display data in accordance with the original graphic characteristics. In this case, the electronic device 1700 may correct and output the display data in the area 1750 including the overlapped area 1730 and adjacent to the overlapped area 1730 as well as the overlapped area 1730. According to one embodiment, the electronic device 1700 may support to output the same or similar color to the adjacent area 1750 based on the color of the display data in the overlapped area 1730. For example, as in a fourth state 1707, the electronic device 1700 may apply the gradient effect to the display data output in the overlapped area 1730 and the area 1750 adjacent to the overlapped area 1730.

Figure 18:
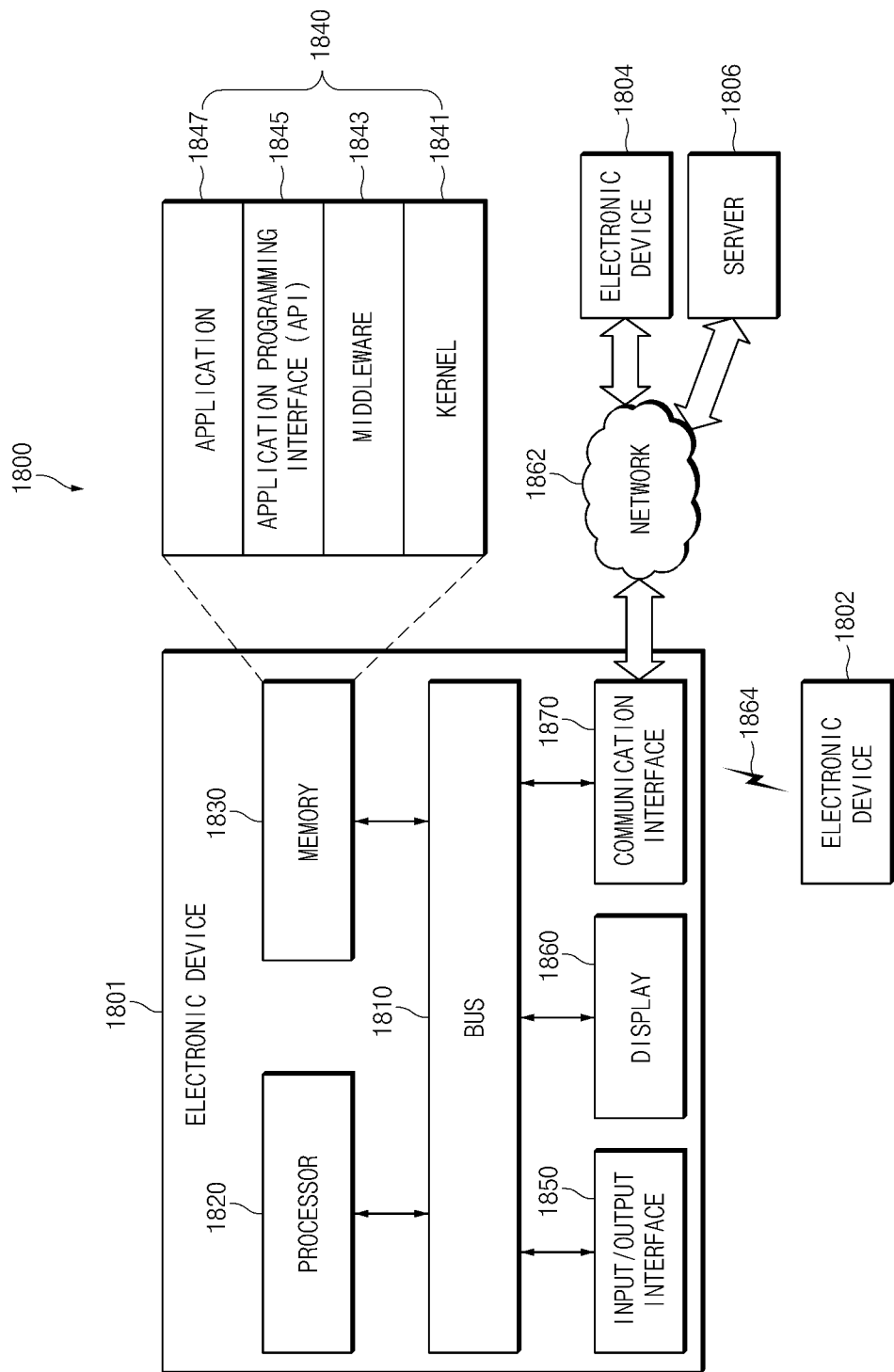
FIG. 18 illustrates an electronic device in a network environment according to various embodiments.

FIG. 18 illustrates an electronic device 1801 in a network environment 1800, according to various embodiments. According to various embodiments, the electronic device 1801 may have the configuration which is the same as or similar to the electronic device 100 of the FIGS. 1A and 1B.

Referring to FIG. 18, according to various embodiments, the electronic device 1801 may be connected with an external device (e.g., a first external electronic device 1802, a second external electronic device 1804, or a server 1806) each other over a network 1862 or a short range communication 1864. The electronic device 1801 may include a bus 1810, a processor 1820, a memory 1830, an input/output interface 1850, a display 1860, and a communication interface 1870. According to an embodiment, the electronic device 1801 may not include at least one of the above-described components or may further include other component(s).

For example, the bus 1810 may interconnect the above-described components 1810 to 1870 and may include a circuit for conveying communications (e.g., a control message and/or data) among the above-described components.

The processor 1820 may include one or more of a central processing unit (CPU), an application processor (AP), or a communication processor (CP). For example, the processor 1820 may perform an arithmetic operation or data processing associated with control and/or communication of at least other components of the electronic device 1801.

The memory 1830 may include a volatile and/or nonvolatile memory. For example, the memory 1830 may store commands or data associated with at least one other component(s) of the electronic device 1801. According to an embodiment, the memory 1830 may store software and/or a program 1840. The program 1840 may include, for example, a kernel 1841, a middleware 1843, an application programming interface (API) 1845, and/or an application program (or "an application") 1847. At least a part of the kernel 1841, the middleware 1843, or the API 1845 may be referred to as an "operating system (OS)".

For example, the kernel 1841 may control or manage system resources (e.g., the bus 1810, the processor 1820, the memory 1830, and the like) that are used to execute operations or functions of other programs (e.g., the middleware 1843, the API 1845, and the application program 1847). Furthermore, the kernel 1841 may provide an interface that allows the middleware 1843, the API 1845, or the application program 1847 to access discrete components of the electronic device 1801 to control or manage system resources.

The middleware 1843 may perform, for example, a mediation role such that the API 1845 or the application program 1847 communicates with the kernel 1841 to exchange data.

Furthermore, the middleware 1843 may process task requests received from the application program 1847 according to a priority. For example, the middleware 1843 may assign the priority, which makes it possible to use a system resource (e.g., the bus 1810, the processor 1820, the memory 1830, or the like) of the electronic device 1801, to at least one of the application program 1847. For example, the middleware 1843 may process the one or more task requests according to the priority assigned to the at least one, which makes it possible to perform scheduling or load balancing on the one or more task requests.

The API 1845 may be, for example, an interface through which the application program 1847 controls a function provided by the kernel 1841 or the middleware 1843, and may include, for example, at least one interface or function (e.g., an instruction) for a file control, a window control, image processing, a character control, or the like.

The input/output interface 1850 may play a role, for example, of an interface which transmits a command or data input from a user or another external device, to other component(s) of the electronic device 1801. Furthermore, the input/output interface 1850 may output a command or data, received from other component(s) of the electronic device 1801, to a user or another external device.

The display 1860 may include, for example, a liquid crystal display (LCD), a light-emitting diode (LED) display, an organic LED (OLED) display, a microelectromechanical systems (MEMS) display, or an electronic paper display. The display 1860 may display, for example, various contents (e.g., a text, an image, a video, an icon, a symbol, and the like) to a user. The display 1860 may include a touch screen and may receive, for example, a touch, gesture, proximity, or hovering input using an electronic pen or a part of a user's body.

For example, the communication interface 1870 may establish communication between the electronic device 1801 and an external device (e.g., the first external electronic device 1802, the second external electronic device 1804, or the server 1806). For example, the communication interface 1870 may be connected to the network 1862 over wireless communication or wired communication to communicate with the external device (e.g., the second external electronic device 1804 or the server 1806).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), or the like, as cellular communication protocol. Furthermore, the wireless communication may include, for example, the short range communication 1864. The short range communication 1864 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1801 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1862 may include at least one of telecommunications networks, for example, a computer network (e.g., LAN or WAN), an Internet, or a telephone network.

Each of the first and second external electronic devices 1802 and 1804 may be a device of which the type is different from or the same as that of the electronic device 1801. According to an embodiment, the server 1806 may include a group of one or more servers. According to various embodiments, all or a portion of operations that the electronic device 1801 will perform may be executed by another or plural electronic devices (e.g., the electronic device 1802 or 1804 or the server 1806). According to an embodiment, in the case where the electronic device 1801 executes any function or service automatically or in response to a request, the electronic device 1801 may not perform the function or the service internally, but, alternatively additionally, it may request at least a portion of a function associated with the electronic device 1801 from another device (e.g., the electronic device 1802 or 1804 or the server 1806). The other electronic device (e.g., the electronic device 1802 or 1804 or the server 1806) may execute the requested function or additional function and may transmit the execution result to the electronic device 1801. The electronic device 1801 may provide the requested function or service using the received result or may additionally process the received result to provide the requested function or service. To this end, for example, cloud computing, distributed computing, or client-server computing may be used.

Figure 19:
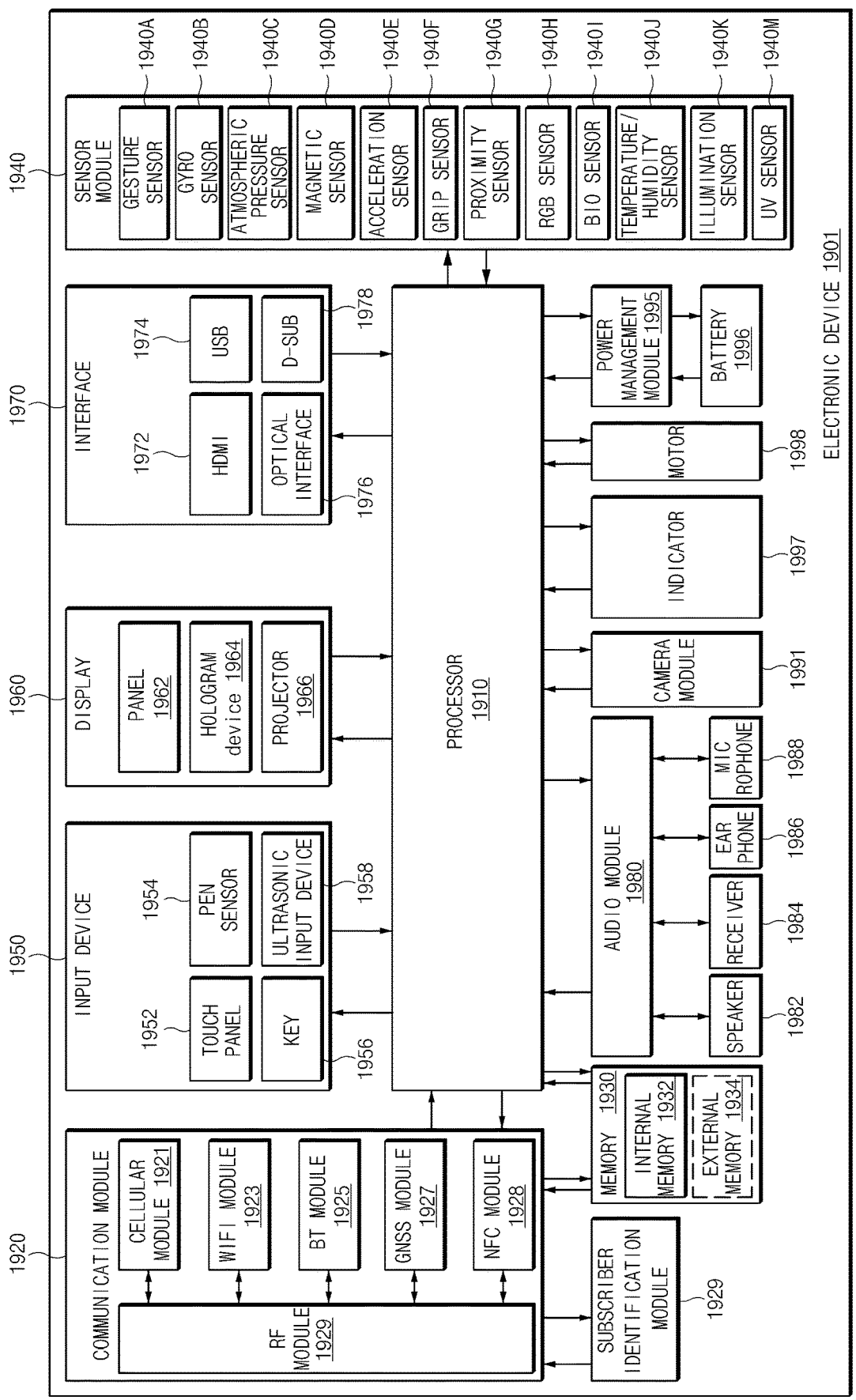
FIG. 19 illustrates a block diagram of an electronic device according to various embodiments.

FIG. 19 illustrates a block diagram of an electronic device 1901, according to various embodiments.

Referring to FIG. 19, the electronic device 1901 may include, for example, all or a part of the electronic device 1801 illustrated in FIG. 18. The electronic device 1901 may include one or more processors (e.g., an application processor (AP)) 1910, a communication module 1920, a subscriber identification module 1929, a memory 1930, a sensor module 1940, an input device 1950, a first display 1960, a second display 1965, an interface 1970, an audio module 1980, a camera module 1991, a power management module 1995, a battery 1996, an indicator 1997, and a motor 1998.

The processor 1910 may drive, for example, an operating system (OS) or an application to control a plurality of hardware or software components connected to the processor 1910 and may process and compute a variety of data. For example, the processor 1910 may be implemented with a System on Chip (SoC). According to an embodiment, the processor 1910 may further include a graphic processing unit (GPU) and/or an image signal processor. The processor 1910 may include at least a part (e.g., a cellular module 1921) of components illustrated in FIG. 19. The processor 1910 may load a command or data, which is received from at least one of other components (e.g., a nonvolatile memory), into a volatile memory and process the loaded command or data. The processor 1910 may store a variety of data in the nonvolatile memory.

The communication module 1920 may be configured the same as or similar to the communication interface 1870 of FIG. 18. The communication module 1920 may include the cellular module 1921, a Wi-Fi module 1922, a Bluetooth (BT) module 1923, a GNSS module 1924 (e.g., a GPS module, a Glonass module, a Beidou module, or a Galileo module), a near field communication (NFC) module 1925, a MST module 1926 and a radio frequency (RF) module 1927.

The cellular module 1921 may provide, for example, voice communication, video communication, a character service, an Internet service, or the like over a communication network. According to an embodiment, the cellular module 1921 may perform discrimination and authentication of the electronic device 1901 within a communication network by using the subscriber identification module (e.g., a SIM card) 1929. According to an embodiment, the cellular module 1921 may perform at least a portion of functions that the processor 1910 provides. According to an embodiment, the cellular module 1921 may include a communication processor (CP).

Each of the Wi-Fi module 1922, the BT module 1923, the GNSS module 1924, the NFC module 1925, or the MST module 1926 may include a processor for processing data exchanged through a corresponding module, for example. According to an embodiment, at least a part (e.g., two or more) of the cellular module 1921, the Wi-Fi module 1922, the BT module 1923, the GNSS module 1924, the NFC module 1925, or the MST module 1926 may be included within one Integrated Circuit (IC) or an IC package.

For example, the RF module 1927 may transmit and receive a communication signal (e.g., an RF signal). For example, the RF module 1927 may include a transceiver, a power amplifier module (PAM), a frequency filter, a low noise amplifier (LNA), an antenna, or the like. According to another embodiment, at least one of the cellular module 1921, the Wi-Fi module 1922, the BT module 1923, the GNSS module 1924, the NFC module 1925, or the MST module 1926 may transmit and receive an RF signal through a separate RF module.

The subscriber identification module 1929 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1930 (e.g., the memory 1830) may include an internal memory 1932 or an external memory 1934. For example, the internal memory 1932 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1934 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1934 may be operatively and/or physically connected to the electronic device 1901 through various interfaces.

A security module 1936 may be a module that includes a storage space of which a security level is higher than that of the memory 1930 and may be a circuit that guarantees safe data storage and a protected execution environment. The security module 1936 may be implemented with a separate circuit and may include a separate processor. For example, the security module 1936 may be in a smart chip or a secure digital (SD) card, which is removable, or may include an embedded secure element (eSE) embedded in a fixed chip of the electronic device 1901. Furthermore, the security module 1936 may operate based on an operating system (OS) that is different from the OS of the electronic device 1901. For example, the security module 1936 may operate based on java card open platform (JCOP) OS.

The sensor module 1940 may measure, for example, a physical quantity or may detect an operation state of the electronic device 1901. The sensor module 1940 may convert the measured or detected information to an electric signal. For example, the sensor module 1940 may include at least one of a gesture sensor 1940A, a gyro sensor 1940B, a barometric pressure sensor 1940C, a magnetic sensor 1940D, an acceleration sensor 1940E, a grip sensor 1940F, the proximity sensor 1940G, a color sensor 1940H (e.g., red, green, blue (RGB) sensor), a biometric sensor 1940I, a temperature/humidity sensor 1940J, an illuminance sensor 1940K, or an UV sensor 1940M. Although not illustrated, additionally or alternatively, the sensor module 1940 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1940 may further include a control circuit for controlling at least one or more sensors included therein. According to an embodiment, the electronic device 1901 may further include a processor that is a part of the processor 1910 or independent of the processor 1910 and is configured to control the sensor module 1940. The processor may control the sensor module 1940 while the processor 1910 remains at a sleep state.

The input device 1950 may include, for example, a touch panel 1952, a (digital) pen sensor 1954, a key 1956, or an ultrasonic input unit 1958. For example, the touch panel 1952 may use at least one of capacitive, resistive, infrared and ultrasonic detecting methods. In addition, the touch panel 1952 may further include a control circuit. The touch panel 1952 may further include a tactile layer to provide a tactile reaction to a user.

The (digital) pen sensor 1954 may be, for example, a part of a touch panel or may include an additional sheet for recognition. The key 1956 may include, for example, a physical button, an optical key, a keypad, or the like. The ultrasonic input device 1958 may detect (or sense) an ultrasonic signal, which is generated from an input device, through a microphone (e.g., a microphone 1988) and may check data corresponding to the detected ultrasonic signal.

According to an embodiment, a display (e.g., the display 1860) may include a first display 1960 or a second display 1965. The first display 1960 may include a first panel 1962 and a first display driver integrated circuit (DDI) 1964 to control the first panel 1962. The first panel 1962 may include a plurality of pixels, and each of the plurality of pixels may include subpixels expressing red, green, and blue (RGB) which constitute three primary colors of light. Each subpixel may include at least one transistor, and may adjust pixel and express color depending on the magnitude of a voltage (or a flowing current) applied to the transistor. The first DDI 1964 may include gate driver circuit parts which control gates of the subpixels with on & off function and source driver circuit parts which adjust the difference in output color between subpixels by adjusting image signals applied to the subpixels. The first DDI 1964 may regulate the transistors of the subpixels of the first panel 1962, thereby providing a full screen of the display. The first DDI 1964 may receive first image data from the processor 1910 and may display the image data on the first panel 1962.

The second display 1965 may include a second panel 1966 and a second display driver integrated circuit (DDI) 1968 to control the second panel 1966. The second panel 1966 may include a plurality of pixels, and each of the plurality of pixels may include subpixels expressing red, green, and blue (RGB) which constitute three primary colors of light. Each subpixel may include at least one transistor, and may adjust pixel and express color depending on the magnitude of a voltage (or a flowing current) applied to the transistor. The second DDI 1968 may include gate driver circuit parts which control gates of the subpixels with on & off function and source driver circuit parts which adjust the difference in output color between subpixels by adjusting image signals applied to the subpixels. The second DDI 1968 may regulate the transistors of the subpixels of the second panel 1966, thereby providing a full screen of the display. The second DDI 1968 may receive second image data, which is the same as or different from the first image data, from the processor 1910 and may display the image data on the second panel 1966.

According to various embodiments, at least one of the first panel 1962 or the second panel 1966 may be implemented, for example, in a flat, flexible, or bendable form. At least one of the first panel 1962 or the second panel 1966 may include one or more modules including the touch panel 1952 and/or the pen sensor 1954.

The first display 1960 and the second display 1965 (e.g., the display 1860) may have different image output schemes (e.g., a hologram device, a projector, and the like (not illustrated)) and/or a control circuit for controlling the image output schemes.

In embodiments implementing a device including a plurality of displays, the processor 1910 may process at least part of content (e.g., image data, image data stream, or the like) changing in several modules of the terminal and the device. The processor 1910 may decide to output the changing content to at least one of the first display 1960 or the second display 1965. For example, the first display 1960 may output data received from the communication module 1920 and the second display 1965 may output command received from the sensor module 1940. In another embodiment, the processor 1910 may output content, which has been output on the first display 1960, to the second display 1965 by switching from the first display 1960 to the second display 1965, or by expanding a display region to the second display 1965. In contrast, the processor 1910 may output content, which has been output on the second display 1965, to the first display 1960 by switching from the second display 1965 to the first display 1960, or by expanding a display region to the first display 1960.

However, a kind, the number, a configuration, and the like of the display may not be limited thereto. According to various embodiments, one of the first display 1960 or the second display 1965 may be omitted. In another embodiment, at least one of other display (e.g., a third display (not illustrated)) may be further included.

The interface 1970 may include, for example, a high-definition multimedia interface (HDMI) 1972, a universal serial bus (USB) 1974, an optical interface 1976, or a D-subminiature (D-sub) 1978. The interface 1970 may be included, for example, in the communication interface 1870 illustrated in FIG. 18. Additionally or alternatively, the interface 1970 may include, for example, a mobile high definition link (MHL) interface, a SD card/multi-media card (MMC) interface, or an infrared data association (IrDA) standard interface.

The audio module 1980 may convert a sound and an electric signal in dual directions. At least a component of the audio module 1980 may be included, for example, in the input/output interface 1850 illustrated in FIG. 18. The audio module 1980 may process, for example, sound information that is input or output through a speaker 1982, a receiver 1984, an earphone 1986, or the microphone 1988.

For example, the camera module 1991 may shoot a still image or a video. According to an embodiment, the camera module 1991 may include at least one or more image sensors (e.g., a front sensor or a rear sensor), a lens, an image signal processor (ISP), or a flash (e.g., an LED or a xenon lamp).

The power management module 1995 may manage, for example, power of the electronic device 1901. According to an embodiment, a power management integrated circuit (PMIC), a charger IC, or a battery or fuel gauge may be included in the power management module 1995. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1996 and a voltage, current or temperature thereof while the battery is charged. The battery 1996 may include, for example, a rechargeable battery and/or a solar battery.

The indicator 1997 may display a specific state of the electronic device 1901 or a part thereof (e.g., the processor 1910), such as a booting state, a message state, a charging state, and the like. The motor 1998 may convert an electrical signal into a mechanical vibration and may generate the following effects: vibration, haptic, and the like. Although not illustrated, a processing device (e.g., a GPU) for supporting a mobile TV may be included in the electronic device 1901. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other to form one entity, so that the functions of the components may be performed in the same manner as before the combination.

Figure 20:
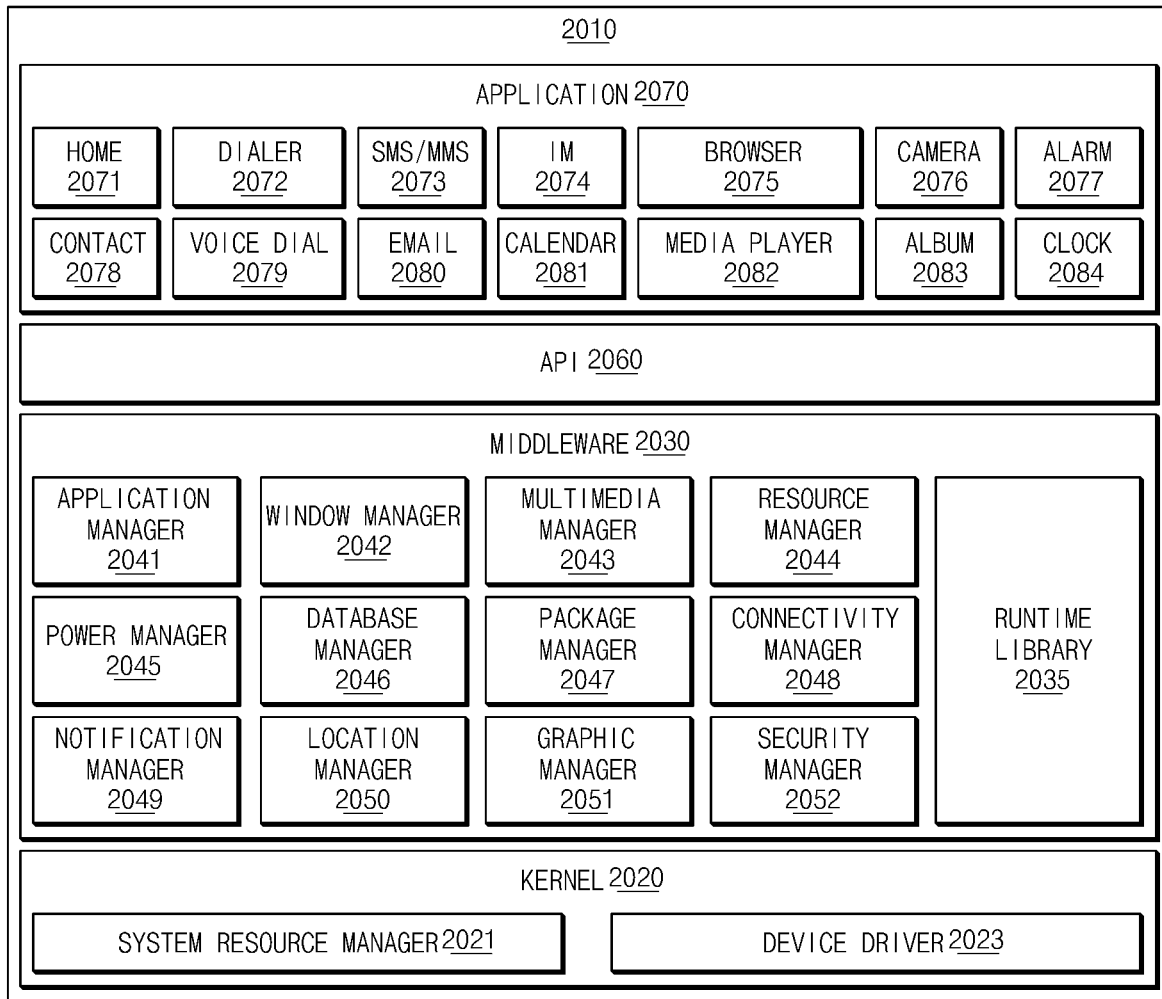
FIG. 20 illustrates a block diagram of a program module according to various embodiments.

FIG. 20 illustrates a block diagram of a program module 2010, according to various embodiments.

According to an embodiment, the program module 2010 (e.g., the program 1840) may include an operating system (OS) to control resources associated with an electronic device (e.g., the electronic device 1801), and/or diverse applications (e.g., the application program 1847) driven on the OS. The OS may be, for example, Android™, iOS™, Windows™, Symbian™, Tizen™, or Bada™.

The program module 2010 may include a kernel 2020, a middleware 2030, an application programming interface (API) 2060, and/or an application 2070. At least a portion of the program module 2010 may be preloaded on an electronic device or may be downloadable from an external electronic device (e.g., the electronic device 1802 or 1804, the server 1806, or the like).

The kernel 2020 (e.g., the kernel 1841) may include, for example, a system resource manager 2021 or a device driver 2023. The system resource manager 2021 may perform control, allocation, or retrieval of system resources. According to an embodiment, the system resource manager 2021 may include a process managing unit, a memory managing unit, or a file system managing unit. The device driver 2023 may include, for example, a display driver, a camera driver, a Bluetooth driver, a shared memory driver, a USB driver, a keypad driver, a Wi-Fi driver, an audio driver, or an inter-process communication (IPC) driver.

In one of various embodiments, the display driver may control at least one or more DDIs. The display driver may include a function for controlling a screen based on a request of the application 2070.

The middleware 2030 may provide, for example, a function that the application 2070 needs in common, or may provide diverse functions to the application 2070 through the API 2060 to allow the application 2070 to efficiently use limited system resources of the electronic device. According to an embodiment, the middleware 2030 (e.g., the middleware 1843) may include at least one of a runtime library 2035, an application manager 2041, a window manager 2042, a multimedia manager 2043, a resource manager 2044, a power manager 2045, a database manager 2046, a package manager 2047, a connectivity manager 2048, a notification manager 2049, a location manager 2050, a graphic manager 2051, or a security manager 2052.

The runtime library 2035 may include, for example, a library module that is used by a compiler to add a new function through a programming language while the application 2070 is being executed. The runtime library 2035 may perform input/output management, memory management, or capacities about arithmetic functions.

The application manager 2041 may manage, for example, a life cycle of at least one application of the application 2070. The window manager 2042 may manage a graphic user interface (GUI) resource that is used in a screen. For example, in the case where at least two or more displays (e.g., the display 1860) are connected each other, the screen may be differently configured or managed depending on the screen ratio or the operation of the application 2070. The multimedia manager 2043 may identify a format necessary for playing diverse media files, and may perform encoding or decoding of media files by using a codec suitable for the format. The resource manager 2044 may manage resources such as a storage space, memory, or source code of at least one application of the application 2070.

The power manager 2045 may operate, for example, with a basic input/output system (BIOS) to manage a battery or power, and may provide power information for an operation of an electronic device. The database manager 2046 may generate, search for, or modify database that is to be used in at least one application of the application 2070. The package manager 2047 may install or update an application that is distributed in the form of package file.

The connectivity manager 2048 may manage, for example, wireless connection such as Wi-Fi or Bluetooth. The notification manager 2049 may display or notify an event such as arrival message, appointment, or proximity notification in a mode that does not disturb a user. The location manager 2050 may manage location information about an electronic device. The graphic manager 2051 may manage a graphic effect that is provided to a user, or manage a user interface relevant thereto. The security manager 2052 may provide a general security function necessary for system security, user authentication, or the like. According to an embodiment, in the case where an electronic device (e.g., the electronic device 1801) includes a telephony function, the middleware 2030 may further include a telephony manager for managing a voice or video call function of the electronic device.

The middleware 2030 may include a middleware module that combines diverse functions of the above-described components. The middleware 2030 may provide a module specialized to each OS kind to provide differentiated functions. Additionally, the middleware 2030 may dynamically remove a part of the preexisting components or may add new components thereto.

The API 2060 (e.g., the API 1845) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 2070 (e.g., the application program 1847) may include, for example, one or more applications capable of providing functions for a home 2071, a dialer 2072, an SMS/MMS 2073, an instant message (IM) 2074, a browser 2075, a camera 2076, an alarm 2077, a contact 2078, a voice dial 2079, an e-mail 2080, a calendar 2081, a media player 2082, an album 2083, or a timepiece 2084 or for offering health care (e.g., measuring an exercise quantity, blood sugar, or the like) or environment information (e.g., information of barometric pressure, humidity, temperature, or the like).

According to an embodiment, the application 2070 may include an application (hereinafter referred to as "information exchanging application" for descriptive convenience) to support information exchange between an electronic device (e.g., the electronic device 1801) and an external electronic device (e.g., the electronic device 1802 or 1804). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device (e.g., the electronic device 1802 or 1804). Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device (e.g., the electronic device 1802 or 1804) which communicates with the electronic device, an application running in the external electronic device, or a service (e.g., a call service, a message service, or the like) provided from the external electronic device.

According to an embodiment, the application 2070 may include an application (e.g., a health care application of a mobile medical device) that is assigned in accordance with an attribute of an external electronic device (e.g., the electronic device 1802 or 1804). According to an embodiment, the application 2070 may include an application that is received from an external electronic device (e.g., the electronic device 1802 or 1804, or the server 1806). According to an embodiment, the application 2070 may include a preloaded application or a third party application that is downloadable from a server. The names of components of the program module 2010 according to the embodiment may be modifiable depending on kinds of operating systems.

According to various embodiments, at least a portion of the program module 2010 may be implemented by software, firmware, hardware, or a combination of two or more thereof. At least a portion of the program module 2010 may be implemented (e.g., executed), for example, by the processor (e.g., the processor 1910). At least a portion of the program module 2010 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1820), may cause the one or more processors to perform a function corresponding to the instruction. The computer-readable storage media, for example, may be the memory 1830.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
a display including a plurality of pixels;
an electrical component overlapping a display area of the display;
a processor electrically connected to the display; and
a memory electrically connected to the processor,
wherein the memory stores instructions that, when executed, cause the processor to:
determine a location of the electrical component and a color of the electrical component, wherein the color of the electrical component is non-transparent;
correct display data of at least one pixel in the plurality of pixels based on the location and the color of the electrical component, wherein the at least one pixel overlaps the location of the electrical component.

2. The electronic device of claim 1, wherein the electrical component is an antenna or a camera.

3. The electronic device of claim 1, wherein the instructions cause the processor to correct the display data through color interpolation based on the color of the electrical component.

4. The electronic device of claim 1, wherein the instructions cause the processor to correct the display data of the at least one pixel and display data of at least one other pixel adjacent to the at least one pixel.

5. The electronic device of claim 4, wherein the instructions cause the processor to correct a color of the display data of the at least one other pixel based on a color of the display data of the at least one pixel.

6. A screen display method of an electronic device, the screen display method comprising:
obtaining content data to be output to a display including a plurality of pixels;
obtaining a color of an electrical component arranged to overlap a display area of the display;
correcting a color of display data of at least one pixel in the plurality of pixels from a first color to a second color, based on the color of the electrical component when a location of the at least one pixel overlaps an arranged location of the electrical component, such that when the second color is combined with the color of the electrical component, the at least one pixel appears to display the first color; and
outputting the corrected display data.

7. The screen display method of claim 6, wherein the electrical component is an antenna or a camera.

8. The screen display method of claim 6, wherein the correcting of the display data includes correcting the display data through color interpolation based on the color of the electrical component.

9. The screen display method of claim 6, further comprising correcting the display data of the at least one pixel overlapped with the arranged location of the electrical component and display data of at least one other pixel adjacent to the at least one pixel.

10. The screen display method of claim 9, wherein the correcting of the display data of the at least one other pixel includes:
correcting a color of the display data of the at least one other pixel based on a color of the display data of the at least one pixel.

11. An electronic device comprising:
a housing including a first surface facing a first direction and a second surface facing a second direction opposite to the first direction;
a display including a plurality of pixels exposed through at least a portion of the first surface;
an electrical component that is overlapped with at least one pixel in the plurality of pixels, exposed to the first surface, and includes a translucent material having a color;
a processor located in the housing and electrically connected to the display; and
a memory electrically connected to the processor,
wherein the memory stores instructions that, when executed, cause the processor to:
determine a first color to be displayed by the at least one pixel;
determine a second color to be displayed by at least one other pixel adjacent to the at least one pixel; and
change the first color to another color, such that when the another color is combined with the color of the translucent material, the at least one pixel appears to display the first color.

* * * * *